United States Patent
Chen et al.

(10) Patent No.: US 12,549,288 B2
(45) Date of Patent: Feb. 10, 2026

(54) HYBRID AUTOMATIC REPEAT REQUEST INFORMATION FEEDBACK METHOD AND DEVICE

(71) Applicant: HUAWEI TECHNOLOGIES CO., LTD., Guangdong (CN)

(72) Inventors: Ying Chen, Hangzhou (CN); Hejia Luo, Hangzhou (CN); Yunfei Qiao, Hangzhou (CN); Rong Li, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 393 days.

(21) Appl. No.: 17/886,620

(22) Filed: Aug. 12, 2022

(65) Prior Publication Data

US 2022/0393803 A1    Dec. 8, 2022

Related U.S. Application Data

(63) Continuation of application No. PCT/CN2021/074365, filed on Jan. 29, 2021.

(30) Foreign Application Priority Data

Feb. 14, 2020 (CN) .......................... 202010093986.7

(51) Int. Cl.
*H04L 1/1812* (2023.01)
*H04L 1/1607* (2023.01)
*H04L 5/00* (2006.01)

(52) U.S. Cl.
CPC .......... *H04L 1/1812* (2013.01); *H04L 1/1614* (2013.01); *H04L 5/0053* (2013.01)

(58) Field of Classification Search
CPC .............................. H04L 1/1812; H04L 1/1614
See application file for complete search history.

(56) References Cited

U.S. PATENT DOCUMENTS

2016/0261379 A1  9/2016 Bergstrom et al.
2017/0317791 A1*  11/2017 Wiberg ................. H04L 1/1861
(Continued)

FOREIGN PATENT DOCUMENTS

CN    105471556 A    4/2016
CN    107332646 A    11/2017
(Continued)

OTHER PUBLICATIONS

R1-1910166, CMCC et al., Considerations on HARQ for Non-Terrestrial Networks, 3GPP TSG RAN WG1 #98 bis , Chongqing, China, Oct. 14-20, 2019, total 5 pages.
(Continued)

*Primary Examiner* — Yemane Mesfin
*Assistant Examiner* — Salma Ayad
(74) *Attorney, Agent, or Firm* — WOMBLE BOND DICKINSON (US) LLP

(57) ABSTRACT

Embodiments of this disclosure provide a hybrid automatic repeat request (HARQ) bitmap information feedback method and a related device. The method includes: A terminal receives indication information from an access network device, where the indication information is used to determine whether HARQ feedback is needed for a transmit block transmitted in a plurality of downlink transmission units. The terminal determines HARQ bitmap information based on the indication information, where the HARQ bitmap information includes HARQ feedback information of at least one target transmission unit, and the target transmission unit indicates a downlink transmission unit that needs HARQ feedback in the plurality of downlink transmission units. The terminal sends the HARQ bitmap information to the access network device. Some embodiments of the present disclosure can reduce feedback resource over- (Continued)

heads in an NTN scenario, reduce a communication delay, and improve a communication throughput rate.

20 Claims, 25 Drawing Sheets

(56) References Cited

U.S. PATENT DOCUMENTS

| | | | | |
|---|---|---|---|---|
| 2020/0127796 | A1* | 4/2020 | Li | H04L 1/1812 |
| 2020/0228174 | A1* | 7/2020 | Nam | H04L 5/005 |
| 2021/0219329 | A1* | 7/2021 | Zhou | H04L 1/1896 |
| 2021/0399839 | A1* | 12/2021 | Liu | H04L 1/1887 |
| 2022/0286242 | A1* | 9/2022 | Khan | H04W 72/23 |
| 2022/0294591 | A1* | 9/2022 | Liu | H04L 1/1864 |
| 2022/0337350 | A1* | 10/2022 | Fu | H04L 5/0096 |
| 2022/0361211 | A1* | 11/2022 | Karaki | H04L 1/1685 |
| 2022/0376844 | A1* | 11/2022 | Muruganathan | H04W 72/23 |
| 2023/0048080 | A1* | 2/2023 | Takahashi | H04W 72/1263 |

FOREIGN PATENT DOCUMENTS

| | | |
|---|---|---|
| CN | 107359969 A | 11/2017 |
| CN | 108023719 A | 5/2018 |
| CN | 109152053 A | 1/2019 |
| CN | 109391422 A | 2/2019 |
| CN | 110034868 A | 7/2019 |
| CN | 110166179 A | 8/2019 |
| CN | 110463134 A | 11/2019 |
| CN | 110535565 A | 12/2019 |
| CN | 111294168 A | 6/2020 |
| RU | 2605472 C2 | 12/2016 |
| WO | 2018143785 A1 | 8/2018 |
| WO | 2019099469 A1 | 5/2019 |
| WO | 2019190664 A1 | 10/2019 |

OTHER PUBLICATIONS

R1-1912471, Samsung, HARQ Procedure in NTN, 3GPP TSG RAN WG1 Meeting #99, Reno, NV, USA, Nov. 18-22, 2019, 4 pages.

3GPP TS 38.211 V16.0.0 (Dec. 2019), 3rd Generation Partnership Project; Technical Specification Group Radio Access Network;NR;Physical channels and modulation(Release 16), 129 pages.

R1-1910388, OPPO et al., Delay-tolerant HARQ operation for NTN, 3GPP TSG RAN WG1 #98bis, Chongqing, China, Oct. 14-20, 2019,total 3 pages.

3GPP TS 38.213 V16.0.0 (Dec. 2019), 3rd Generation Partnership Project; Technical Specification Group Radio Access Network;NR;Physical layer procedures for control(Release 16), 147 pages.

R2-1904519, Ericsson et al., On switching off HARQ for NTN, 3GPP TSG-RAN WG2 #105bis Tdoc, Xi''an, China, Apr. 8-Apr. 12, 2019, total 5 pages.

3GPP TS 38.214 V16.0.0 (Dec. 2019), 3rd Generation Partnership Project;Technical Specification Group Radio Access Network; NR;Physical layer procedures for data(Release 16), 147 pages.

R2-1914197, CMCC et al., Further consideration on HARQ configuration in NTN, 3GPP TSG-RAN WG2 Meeting 107bis,Chongqing, Oct. 14-18, 2019, total 5 pages.

3GPP TS 38.331 V15.8.0 (Dec. 2019), 3rd Generation Partnership Project;Technical Specification Group Radio Access Network;NR;Radio Resource Control (RRC) protocol specification(Release 15), 532 pages.

R1-1912349, Sony, Discussion on delay-tolerant HARQ for NTN, 3GPP TSG RAN WG1 Meeting #99 , Reno, USA, Nov. 18-22, 2019, 6 pages.

R1-1718645, Ericsson, On HARQ Management, 3GPP TSG RAN1 WG1 Meeting #90bis, Prague, Czech Republic, Oct. 9-13, 2017, 10 pages.

* cited by examiner

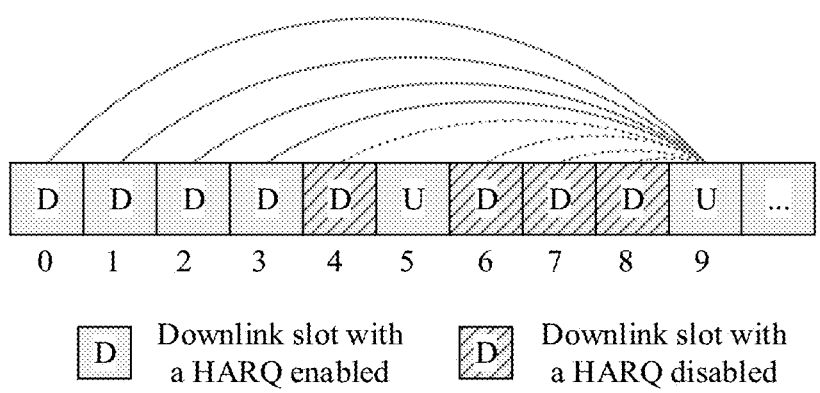
FIG. 3
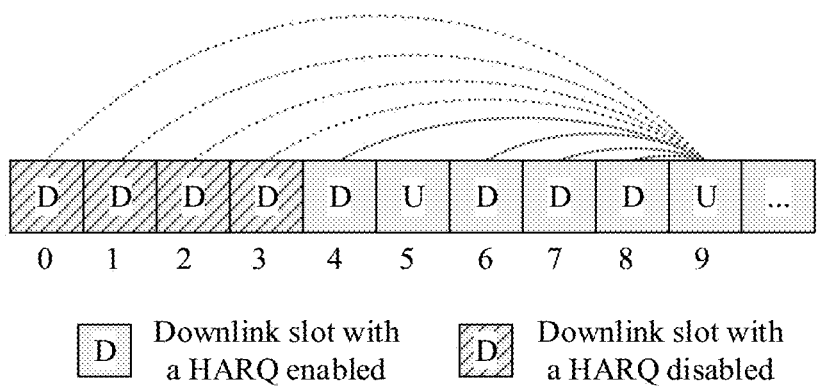
FIG. 4
FIG. 5

HYBRID AUTOMATIC REPEAT REQUEST INFORMATION FEEDBACK METHOD AND DEVICE

CROSS-REFERENCE TO RELATED APPLICATIONS

This application is a continuation of International Patent Application No. PCT/CN2021/074365, filed on Jan. 29, 2021, which claims priority to Chinese Patent Application No. 202010093986.7, filed on Feb. 14, 2020. The disclosures of the aforementioned applications are hereby incorporated by reference in their entireties.

TECHNICAL FIELD

This disclosure relates to the field of communication technologies, and in particular, to a hybrid automatic repeat request (HARQ) bitmap information feedback method and a related device.

BACKGROUND

With development of information technologies, more urgent requirements are imposed on high efficiency, mobility, diversity, and the like of communication. Currently, a development focus of the communication system field is global mobile communication, and an important part of the global mobile communication is satellite communication. Satellites play an irreplaceable role in some important fields such as space communication, aeronautical communication, maritime communication, and military communication. Satellite communication has advantages of a long communication distance, a large coverage area, and flexible networking, and can provide services for various mobile terminals and fixed terminals. The 3rd generation partnership project (3GPP) standards organization has released the 5th generation (5G) mobile communication technology standard, to research a space-ground integrated communication technology. The technology mainly integrates the existing 5G standard with a non-terrestrial network (NTN). The NTN includes various satellite-related communication technologies, and communication technologies related to non-terrestrial communication devices such as uncrewed aerial vehicles and hot air balloons, to achieve full coverage around the world.

To ensure reliability and efficiency of data transmission, the 5G standard supports a hybrid automatic repeat request (HARQ) technology. Data sent by a transmit end (for example, a network device) may correspond to a transmit block (TB) at a physical layer, and the transmit end adds cyclic redundancy check (CRC) to the TB, so that a terminal checks whether the TB is successfully received. A receive end (for example, a terminal) feeds back, to the transmit end, a decoding result of the data received from the transmit end. An acknowledgement (ACK) is fed back if the data is correctly decoded, and a negative acknowledgement (NACK) is fed back if the data cannot be correctly decoded. If receiving an ACK, the transmit end may transmit new data to the receive end; or if receiving an NACK, the transmit end may retransmit the data to the receive end. The ACK or the NACK may be referred to as HARQ feedback information.

Further, the TB may alternatively be divided into several code blocks (CB). The transmit end (for example, a network device) may add corresponding CRC to each CB, to check whether each CB is successfully received. The receive end (for example, a terminal) decodes received data. If CRC check of all CBs succeeds and CRC check of the TB succeeds, the receive end feeds back an ACK to the transmit end. If CRC check of a CB fails or CRC check of the TB fails, the receive end feeds back an NACK to the transmit end.

In the conventional technology, HARQ feedback information of a plurality of TBs may be placed in one piece of HARQ bitmap information and transmitted from a terminal to a network device. The plurality of TBs may be from different downlink slots and/or different codewords in multiple-input multiple-output (MIMO) and/or different carriers in carrier aggregation. The HARQ bitmap information may also be referred to as a HARQ codebook, and a size of the HARQ codebook is a quantity of bits of the HARQ feedback information included in the codebook.

However, the NTN has a large communication delay. If a conventional HARQ technology is directly used, for example, if a quantity of HARQ processes is not changed (for example, 8 or 16 processes), a low communication throughput rate is caused. In addition, if all HARQ processes in the conventional retransmission technology are used, a communication delay and buffer pressure are greatly increased.

SUMMARY

Embodiments of the present disclosure provide a HARQ bitmap information feedback method and a related device. This can reduce feedback resource overheads, reduce a communication delay, and improve a communication throughput rate in an NTN scenario.

According to a first aspect, an embodiment of the present disclosure provides a HARQ bitmap information feedback method. The method is described from a terminal side, and includes: A terminal receives indication information from an access network device, where the indication information is used to determine whether HARQ feedback is needed for a transmit block transmitted in a plurality of downlink transmission units. The terminal determines HARQ bitmap information based on the indication information, where the HARQ bitmap information includes HARQ feedback information of at least one target transmission unit, and the target transmission unit indicates a downlink transmission unit that needs HARQ feedback in the plurality of downlink transmission units. The terminal sends the HARQ bitmap information to the access network device. In view of this, the access network device may determine, based on the HARQ feedback information, whether to perform retransmission.

The downlink transmission unit may be configured to bear downlink data transmission. In some embodiments, a downlink transmission unit may be one subframe, one time domain symbol, a plurality of time domain symbols, one slot, a plurality of slots, one mini-slot, a plurality of mini-slots, or a combination of a mini-slot and a slot, or a combination of a symbol and a slot, or a combination of a mini-slot and a slot. A quantity of symbols or a length of a symbol of each transmission unit is not necessarily the same. For example, when the downlink transmission unit is a slot, the downlink transmission unit may also be referred to as a downlink slot or a downlink transmission slot. In some embodiments, the transmission slot in this embodiment may be several symbols, a slot, a plurality of slots, or the like. In other words, the transmission slot in this embodiment is not limited to a slot (for example, a slot with a length of 1 ms) in a physical sense.

The HARQ bitmap information may also be referred to as a HARQ codebook, and the HARQ bitmap information does not include HARQ feedback information of a non-target transmission unit. The target transmission unit indicates a downlink transmission unit that needs HARQ feedback in the plurality of downlink transmission units, and the non-target transmission unit indicates a downlink transmission unit that does not need HARQ feedback in the plurality of downlink transmission units. In some embodiments, when the non-target transmission unit indicates a downlink transmission unit whose HARQ feedback information is preset information in the plurality of downlink transmission units, the HARQ bitmap information may also include HARQ feedback information of the non-target transmission unit. For example, when the preset information is an acknowledgement ACK, the feedback information of the non-target transmission unit in the HARQ bitmap information is an ACK.

It can be learned that in this embodiment of the present disclosure, the access network device may explicitly or implicitly indicate, to the terminal by using specified indication information, whether HARQ feedback is needed for a transmit block transmitted in a plurality of downlink transmission units. The terminal determines, based on the indication information, which downlink transmission units need HARQ feedback and which downlink transmission units do not need HARQ feedback, and generates a semi-static codebook or a dynamic codebook based on HARQ feedback information of the downlink transmission units that need HARQ feedback. To be specific, the semi-static codebook does not include a receiving status of downlink data that does not need HARQ feedback. This can reduce a size of the semi-static codebook for feedback and reduce feedback resource overheads. In addition, because feedback-retransmission processes of some processes or some data of the processes are reduced, data transmission processes of the processes or the data are more compact and fast. This can improve a communication throughput rate and reduce a communication delay. The dynamic codebook includes HARQ feedback information of a downlink transmission unit that needs HARQ feedback and preset information of a downlink transmission unit that does not need HARQ feedback. To be specific, for the downlink transmission unit that does not need HARQ feedback, the corresponding dynamic codebook may also carry the preset information. The preset information includes one or more of an acknowledgement ACK, a negative acknowledgement NACK, and a decoding result. It should be noted that the dynamic codebook described in this embodiment includes a dynamic codebook of a standard dynamic type and a dynamic codebook of an enhanced dynamic type.

With reference to the first aspect, in a possible embodiment, that the terminal determines the HARQ bitmap information based on the indication information includes: The terminal determines the at least one target transmission unit based on the indication information and by using a preset mapping relationship, where the preset mapping relationship includes a mapping relationship between the indication information and the at least one target transmission unit. The terminal forms the HARQ bitmap information based on the HARQ feedback information of the at least one target transmission unit.

There may be a plurality of preset mapping relationships, and each preset mapping relationship reflects an association between specific indication information and a specific indication result (namely, at least one corresponding target transmission unit). The association may be a direct association, or may be an association performed by using an algorithm or a rule. Because there is a mapping relationship between the indication information and at least one downlink slot, the terminal may determine, after receiving the indication information and based on the mapping relationship, at least one downlink slot that needs HARQ feedback, and generate HARQ feedback information, for example, an ACK or an NACK, corresponding to the at least one downlink slot based on a data receiving status of the at least one downlink slot that needs HARQ feedback.

By using the preset mapping relationship, the access network device only needs to send indication information to the terminal (without a plurality of information exchanges between the access network device and the terminal), and the terminal finally generates a HARQ codebook that has a small quantity of bits by using a calculation capability of the terminal and by using the preset mapping relationship. Therefore, this embodiment of the present disclosure fully utilizes a capability of a device, reduces occupation of communication resources, and reduces feedback resource overheads. Because feedback-retransmission processes of some processes or some data of the processes are reduced, data transmission processes of the processes or the data are more compact and fast. This can improve a communication throughput rate and reduce a communication delay.

With reference to the first aspect, in a possible embodiment, the indication information includes process indication information. The preset mapping relationship includes a mapping relationship between the process indication information and a process that needs HARQ feedback, and a mapping relationship between the process that needs HARQ feedback and the at least one target transmission unit. Accordingly, that the terminal determines the at least one target transmission unit based on the indication information and by using a preset mapping relationship includes: The terminal determines, based on the process indication information, the process that needs HARQ feedback. The terminal further determines the at least one target transmission unit based on the process that needs HARQ feedback.

In a possible embodiment, there is a mapping relationship between the process indication information and a process that needs HARQ feedback, and there is a mapping relationship between the process that needs HARQ feedback and the at least one target transmission unit. Specifically, the process indication information may directly or indirectly indicate a process that needs HARQ feedback and a process that does not need HARQ feedback. Each process may correspond to one or more downlink transmission units. Therefore, whether HARQ feedback is needed for a transmit block transmitted in a plurality of downlink transmission units may be further determined based on the process indication information.

After obtaining data transmitted in a plurality of candidate downlink transmission slots, the terminal may first decode the data transmitted in the downlink transmission slots. If it is found that a HARQ process number indicated by control information (for example, DCI) in the data corresponds to a disabled HARQ process, neither an ACK nor an NACK is generated after decoding. If it is found that the HARQ process number indicated by the control information (for example, DCI) in the data corresponds to a not disabled HARQ process, an ACK or an NACK is accordingly generated based on whether decoding is correct. For the not disabled HARQ process, if no data transmission is performed in a slot, an NACK may be fed back accordingly. To be specific, after decoding, the terminal determines a size of a codebook, and knows which slot or data needs feedback and which slot or data does not need feedback, to generate a corresponding semi-static codebook. Therefore, in this embodiment, decoding information (for example, a process number) of the terminal in the decoding process can be used to finally generate a codebook that has a small quantity of bits, thereby reducing feedback resource overheads.

With reference to the first aspect, in a possible embodiment, the indication information includes transmission unit indication information. The transmission unit indication information indicates the at least one target transmission unit and/or at least one non-target transmission unit. Accordingly, that the terminal determines the at least one target transmission unit based on the indication information and by using a preset mapping relationship includes: The terminal determines the at least one target transmission unit based on the transmission unit indication information.

The transmission unit indication information directly or indirectly indicates at least one downlink slot that needs HARQ feedback and/or at least one downlink slot that does not need HARQ feedback.

In an embodiment, the transmission unit indication information may be slot indication information. The slot indication information directly or indirectly indicates a slot that needs HARQ feedback and/or a slot that does not need HARQ feedback in a plurality of downlink slots.

Specifically, when the transmission unit indication information indicates a downlink slot that does not need HARQ feedback, after obtaining a plurality of candidate downlink slots, the terminal determines a downlink slot other than a downlink slot that does not need HARQ feedback in these downlink transmission slots as a downlink slot that needs HARQ feedback, decodes data transmitted in the downlink slot that needs HARQ feedback, generates an ACK or an NACK based on whether decoding is correct, and does not perform feedback for data transmitted in a downlink slot that does not need HARQ feedback. If no data transmission is performed in some downlink slots that need HARQ feedback, an NACK is also fed back. The terminal combines HARQ feedback information of all downlink slots that need HARQ feedback, to form a HARQ semi-static codebook. Therefore, in this embodiment, less intervention is performed in the data decoding process, thereby ensuring decoding efficiency.

With reference to the first aspect, in a possible embodiment, when the transmission unit indication information indicates the non-target transmission unit, that the terminal determines the at least one target transmission unit based on the transmission unit indication information includes: determining a downlink transmission unit other than the non-target transmission unit in the plurality of downlink transmission units as the at least one target transmission unit. In this embodiment, the transmission unit indication information only needs to indicate only some slots. This can reduce a quantity of bits of the transmission unit indication information, and further reduce occupation of communication resources.

With reference to the first aspect, in a possible embodiment, the indication information includes parameter information. The preset mapping relationship includes a preset algorithm used to determine the at least one target transmission unit. Accordingly, that the terminal determines the at least one target transmission unit based on the indication information and by using a preset mapping relationship includes: The terminal determines the at least one target transmission unit based on the parameter information and by using the preset algorithm.

The parameter information is used to determine the at least one target transmission unit by using a preset algorithm.

The access network device properly configures a downlink slot used for data transmission that needs HARQ feedback and a downlink slot used for data transmission that does not need HARQ feedback, and sends the parameter information to the terminal. The terminal may determine, based on the parameter information and by using the preset algorithm, whether HARQ feedback is needed for a transmit block transmitted in a plurality of downlink slots. The terminal generates a semi-static codebook based on HARQ feedback information of the downlink slot that needs HARQ feedback. To be specific, the semi-static codebook does not include a receiving status of downlink data that does not need HARQ feedback. This can reduce a size of the semi-static codebook for feedback and reduce feedback resource overheads.

With reference to the first aspect, in a possible embodiment, there are a plurality of target transmission units, and the plurality of target transmission units are consecutive downlink transmission units.

With reference to the first aspect, in a possible embodiment, there are a plurality of non-target transmission units, and the plurality of non-target transmission units are consecutive downlink transmission units.

In other words, a slot that needs HARQ feedback and a slot that does not need HARQ feedback may not be alternately spaced through slot configuration. Downlink slots for data transmission with a HARQ enabled is designed to occupy some centralized locations in time domain, or downlink slots for data transmission with a HARQ disabled is designed to occupy some centralized locations in the time domain. It should be noted that uplink slots are not considered for so-called "consecutive downlink slots" in this specification. To be specific, for consecutive downlink slots, two downlink slots may be downlink slots whose slot numbers are consecutive, or one or more uplink slots may exist between the two downlink slots. This can reduce feedback resource overheads to a greatest extent, and improve a speed of generating a HARQ codebook.

With reference to the first aspect, in a possible embodiment, the at least one target transmission unit and the at least one non-target transmission unit are alternately spaced in time domain.

In other words, a slot that needs HARQ feedback and a slot that does not need HARQ feedback may be alternately spaced through slot configuration. This can greatly improve slot configuration flexibility, and meet diversified slot allocation requirements.

With reference to the first aspect, in a possible embodiment, the indication information includes bundling information. That the terminal determines the HARQ bitmap information based on the indication information includes: The terminal performs an AND logical operation on the HARQ feedback information of the at least one target transmission unit and the HARQ feedback information of the at least one non-target transmission unit based on the bundling information, to obtain the HARQ bitmap information.

In this embodiment, the terminal may determine, based on the parameter information and by using the preset algorithm, whether HARQ feedback is needed for a transmit block transmitted in a plurality of downlink slots, and perform an AND logical operation on HARQ feedback information of at least one downlink slot that needs HARQ feedback and HARQ feedback information of at least one downlink slot that does not need HARQ feedback based on the bundling information, to obtain a HARQ codebook. The HARQ codebook is considered not to include a receiving status of downlink data that does not need HARQ feedback. This can reduce a size of the semi-static codebook for feedback, reduce feedback resource overheads, improve a communication throughput rate, and reduce a communication delay.

With reference to the first aspect, in a possible embodiment, the target transmission unit and/or the non-target transmission unit are/is configured at a radio resource control RRC layer of the access network device. That the terminal receives the indication information from the access network device includes:

The terminal obtains the indication information by using RRC signaling from the access network device.

For example, when the terminal accesses the access network device and establishes an RRC connection, the access network device may send the indication information to the terminal by using the RRC signaling. In a semi-static scheduling period, the terminal may generate a semi-static codebook and perform feedback based on the indication information. This can reduce occupation of communication resources, improve a communication throughput rate, and reduce a communication delay.

With reference to the first aspect, in a possible embodiment, the target transmission unit and the non-target transmission unit are configured at a media access control MAC layer of the access network device. That the terminal receives the indication information from the access network device includes: The terminal obtains the indication information by using MAC signaling from the access network device.

For another example, in a process in which the terminal performs service communication with the access network device, the access network device may send the indication information to the terminal by using the RRC signaling or the MAC signaling based on a service status and a network traffic status in real time. The terminal may generate a semi-static codebook and perform feedback based on the indication information. The MAC signaling may also be used to obtain a more complex slot configuration than that obtained by using the RRC signaling. This can improve service communication flexibility, improve a communication throughput rate, and reduce a communication delay.

With reference to the first aspect, in a possible embodiment, the target transmission unit and the non-target transmission unit are configured by using a level-based indication of the RRC layer and the MAC layer of the access network device.

With reference to the first aspect, in a possible embodiment, that the terminal receives the indication information from the access network device includes:

The terminal obtains the indication information by using broadcast information system information block (SIB) from the access network device.

For another example, for a plurality of terminals in a cell, or a plurality of terminals that have a same or similar service requirement, the access network device may send the indication information to the plurality of terminals in a broadcast or multicast manner. In a semi-static scheduling period of each terminal, each terminal may generate a semi-static codebook and perform feedback based on the indication information. This can improve communication convenience, meet a service requirement of each terminal, improve a communication throughput rate, and reduce a communication delay.

With reference to the first aspect, in a possible embodiment, the terminal obtains the indication information by using downlink control information DCI from the access network device.

With reference to the first aspect, in a possible embodiment, that the terminal sends the HARQ bitmap information to the access network device includes: The terminal sends the HARQ bitmap information to the access network device through an uplink data channel.

With reference to the first aspect, in a possible embodiment, that the terminal sends the HARQ bitmap information to the access network device includes: The terminal sends the HARQ bitmap information to the access network device through an uplink control channel.

With reference to the first aspect, in a possible embodiment, a type of the HARQ bitmap information is a semi-static type, and the HARQ bitmap information scheduled in a semi-static mode may also be referred to as a HARQ semi-static codebook or a semi-static codebook.

According to a second aspect, an embodiment of the present disclosure provides another HARQ bitmap information feedback method. The method is described from an access network device side, and includes: An access network device sends indication information to a terminal, where the indication information is used to determine whether HARQ feedback is needed for a transmit block transmitted in a plurality of downlink transmission units. The access network device receives HARQ bitmap information from the terminal, where the HARQ bitmap information includes HARQ feedback information of at least one target transmission unit, and does not include HARQ feedback information of a non-target transmission unit. The target transmission unit indicates a downlink transmission unit that needs HARQ feedback in the plurality of downlink transmission units. The non-target transmission unit indicates a downlink transmission unit that does not need HARQ feedback in the plurality of downlink transmission units, or a downlink transmission unit whose HARQ feedback information is preset information in the plurality of downlink transmission units. The preset information is one or more of an acknowledgement ACK, a negative acknowledgement NACK, and a decoding result. In view of this, the access network device may determine, based on the HARQ feedback information, whether to perform retransmission.

The downlink transmission unit may be configured to bear downlink data transmission. In some embodiments, a downlink transmission unit may be one subframe, one time domain symbol, a plurality of time domain symbols, one slot, a plurality of slots, one mini-slot, a plurality of mini-slots, or a combination of a mini-slot and a slot, or a combination of a symbol and a slot, or a combination of a mini-slot and a slot. A quantity of symbols or a length of a symbol of each transmission unit is not necessarily the same. For example, when the downlink transmission unit is a slot, the downlink transmission unit may also be referred to as a downlink slot or a downlink transmission slot.

The HARQ bitmap information may also be referred to as a HARQ codebook, and the HARQ bitmap information does not include the HARQ feedback information of the non-target transmission unit. The target transmission unit indicates a downlink transmission unit that needs HARQ feedback in the plurality of downlink transmission units. The non-target transmission unit indicates a downlink transmission unit that does not need HARQ feedback in the plurality of downlink transmission units, or a downlink transmission unit whose HARQ feedback information is preset information in the plurality of downlink transmission units. The preset information is one or more of an acknowledgement ACK, a negative acknowledgement NACK, and a decoding result.

It can be learned that in this embodiment of the present disclosure, the access network device may explicitly or implicitly indicate, to the terminal by using specified indication information, whether HARQ feedback is needed for a transmit block transmitted in a plurality of downlink transmission units. The terminal determines, based on the indication information, which downlink transmission units need HARQ feedback and which downlink transmission units do not need HARQ feedback, and generates a semi-static codebook based on HARQ feedback information of the downlink transmission units that need HARQ feedback. To be specific, the semi-static codebook does not include a receiving status of downlink data that does not need HARQ feedback. This can reduce a size of the semi-static codebook for feedback and reduce feedback resource overheads. In addition, because feedback-retransmission processes of some processes or some data of the processes are reduced, data transmission processes of the processes or the data are more compact and fast. This can improve a communication throughput rate and reduce a communication delay.

In some embodiments, the terminal determines, based on the indication information, which downlink transmission units need HARQ feedback and which downlink transmission units do not need HARQ feedback, and generates a dynamic codebook based on HARQ feedback information of the downlink transmission units that need HARQ feedback and preset information of the downlink transmission units that do not need HARQ feedback. To be specific, for the downlink transmission unit that does not need HARQ feedback, the corresponding dynamic codebook may also carry the preset information. The preset information includes one or more of an acknowledgement ACK, a negative acknowledgement NACK, and a decoding result.

With reference to the second aspect, in a possible embodiment, there is a mapping relationship between the indication information and the at least one target transmission unit.

With reference to the second aspect, in a possible embodiment, the indication information includes process indication information. There is a mapping relationship between the process indication information and a process that needs HARQ feedback, and there is a mapping relationship between the process that needs HARQ feedback and the at least one target transmission unit.

With reference to the second aspect, in a possible embodiment, the indication information includes transmission unit indication information. The transmission unit indication information indicates the at least one target transmission unit and/or at least one non-target transmission unit.

With reference to the second aspect, in a possible embodiment, the indication information includes parameter information. The parameter information is used to determine the at least one target transmission unit by using a preset algorithm.

With reference to the second aspect, in a possible embodiment, there are a plurality of target transmission units, and the plurality of target transmission units are consecutive downlink transmission units.

With reference to the second aspect, in a possible embodiment, there are a plurality of non-target transmission units, and the plurality of non-target transmission units are consecutive downlink transmission units.

With reference to the second aspect, in a possible embodiment, the at least one target transmission unit and the at least one non-target transmission unit are alternately spaced in time domain.

With reference to the second aspect, in a possible embodiment, the indication information includes bundling information. The bundling information indicates to perform an AND logical operation on the HARQ feedback information of the at least one target transmission unit and the HARQ feedback information of the at least one non-target transmission unit, to obtain the HARQ bitmap information.

With reference to the second aspect, in a possible embodiment, before the access network device sends the indication information to the terminal, the method further includes: The access network device configures the target transmission unit and/or the non-target transmission unit by using an RRC layer. Accordingly, that the access network device sends the indication information to the terminal includes: The access network device sends the indication information to the terminal by using RRC signaling.

With reference to the second aspect, in a possible embodiment, before the access network device sends the indication information to the terminal, the method further includes: The access network device configures the target transmission unit and the non-target transmission unit by using a MAC layer. Accordingly, that the access network device sends the indication information to the terminal includes: The access network device sends the indication information to the terminal by using MAC signaling.

With reference to the second aspect, in a possible embodiment, before the access network device sends the indication information to the terminal, the method further includes: The access network device configures the target transmission unit and the non-target transmission unit by using a level-based indication of the RRC layer and the MAC layer.

With reference to the second aspect, in a possible embodiment, that the access network device sends the indication information to the terminal includes:

The access network device sends the indication information to the terminal by using broadcast information.

With reference to the second aspect, in a possible embodiment, that the access network device sends the indication information to the terminal includes: The access network device sends the indication information to the terminal by using downlink control information DCI.

With reference to the second aspect, in a possible embodiment, that the access network device receives the HARQ bitmap information from the terminal includes: the access network device receives the HARQ bitmap information from the terminal through an uplink data channel.

With reference to the second aspect, in a possible embodiment, that the access network device receives the HARQ bitmap information from the terminal includes: the access network device receives the HARQ bitmap information from the terminal through an uplink control channel.

With reference to the second aspect, in a possible embodiment, the HARQ bitmap information is of a semi-static type.

According to a third aspect, an embodiment of the present disclosure provides a terminal. The terminal includes: a receiving module, configured to receive indication information from an access network device, where the indication information is used to determine whether HARQ feedback is needed for a transmit block transmitted in a plurality of downlink transmission units; a determining module, configured to determine HARQ bitmap information based on the indication information, where the HARQ bitmap information includes HARQ feedback information of at least one target transmission unit, and the target transmission unit indicates a downlink transmission unit that needs HARQ feedback in the plurality of downlink transmission units; and a sending module, configured to send the HARQ bitmap information to the access network device.

The modules of the terminal may be configured to implement the method described in any one of the first aspect or the possible embodiments of the first aspect.

According to a fourth aspect, an embodiment of the present disclosure provides an access network device. The access network device includes: a sending module, configured to send indication information to a terminal, where the indication information is used to determine whether HARQ feedback is needed for a transmit block transmitted in a plurality of downlink transmission units; and a receiving module, configured to receive HARQ bitmap information from the terminal, where the HARQ bitmap information includes HARQ feedback information of at least one target transmission unit, and the target transmission unit indicates a downlink transmission unit that needs HARQ feedback in the plurality of downlink transmission units.

The modules of the access network device may be configured to implement the method described in any one of the second aspect or the possible embodiments of the second aspect.

According to a fifth aspect, an embodiment of the present disclosure provides a terminal. The terminal includes a transmitter, a receiver, a memory, and a processor. The transmitter is configured to send data to an access network device, the receiver is configured to receive data from the access network device, the memory is configured to store program instructions, and the processor invokes the program instructions stored in the memory to perform the method described in any one of the first aspect or the possible embodiments of the first aspect.

According to a sixth aspect, an embodiment of the present disclosure provides an access network device. The access network device includes a transmitter, a receiver, a memory, and a processor. The transmitter is configured to send data to a terminal, the receiver is configured to receive data from the terminal, the memory is configured to store program instructions, and the processor invokes the program instructions stored in the memory to perform the method described in any one of the second aspect or the possible embodiments of the second aspect.

According to a seventh aspect, an embodiment of the present disclosure provides a chip. The chip may be used in, for example, a terminal. The chip includes an input interface, an output interface, and a logic circuit. The output interface is configured to send data to an access network device, the input interface is configured to receive data from the access network device, and the logic circuit is configured to control the chip to perform the method described in any one of the first aspect or the possible embodiments of the first aspect.

According to an eighth aspect, an embodiment of the present disclosure provides a chip. The chip may be used in, for example, an access network device. The chip includes an input interface, an output interface, and a logic circuit. The output interface is configured to send data to a terminal, the input interface is configured to receive data from the terminal, and the logic circuit is configured to control the chip to perform the method described in any one of the second aspect or the possible embodiments of the second aspect.

According to a ninth aspect, an embodiment of the present disclosure provides a computer-readable non-volatile storage medium, including computer instructions. The computer instructions are executed to implement the method described in any one of the first aspect or the possible embodiments of the first aspect.

According to a tenth aspect, an embodiment of the present disclosure provides a computer-readable non-volatile storage medium, including computer instructions. The computer instructions are executed to implement the method described in any one of the second aspect or the possible embodiments of the second aspect.

According to an eleventh aspect, the present disclosure provides a computer program product, including instructions. When the computer program is executed by a computer, the instructions enable the computer to perform the method described in any one of the first aspect or the possible embodiments of the first aspect.

According to a twelfth aspect, the present disclosure provides a computer program product, including instructions. When the computer program is executed by a computer, the instructions enable the computer to perform the method described in any one of the second aspect or the possible embodiments of the second aspect.

It can be learned that in embodiments of the present disclosure, the access network device properly configures a downlink transmission unit used for data transmission that needs HARQ feedback and a downlink transmission unit used for data transmission that does not need HARQ feedback, and explicitly or implicitly indicates, to the terminal by using specified indication information, whether HARQ feedback is needed for a transmit block transmitted in a plurality of downlink transmission units. The terminal determines, based on the indication information, which downlink transmission units need HARQ feedback and which downlink transmission units do not need HARQ feedback, and generates a semi-static codebook based on HARQ feedback information of the downlink transmission units that need HARQ feedback. To be specific, the semi-static codebook does not include a receiving status of downlink data that does not need HARQ feedback. This can reduce a size of the semi-static codebook for feedback and reduce feedback resource overheads. In addition, because feedback-retransmission processes of some processes or some data of the processes are reduced, data transmission processes of the processes or the data are more compact and fast. This can improve a communication throughput rate and reduce a communication delay.

BRIEF DESCRIPTION OF DRAWINGS

FIG. 3 is a diagram of an example of another HARQ codebook;

FIG. 4 is a diagram of an example of a slot configuration scenario according to an embodiment of the present disclosure;

FIG. 5 is a diagram of an example of another slot configuration scenario according to an embodiment of the present disclosure;

DESCRIPTION OF EMBODIMENTS

Figure 1:
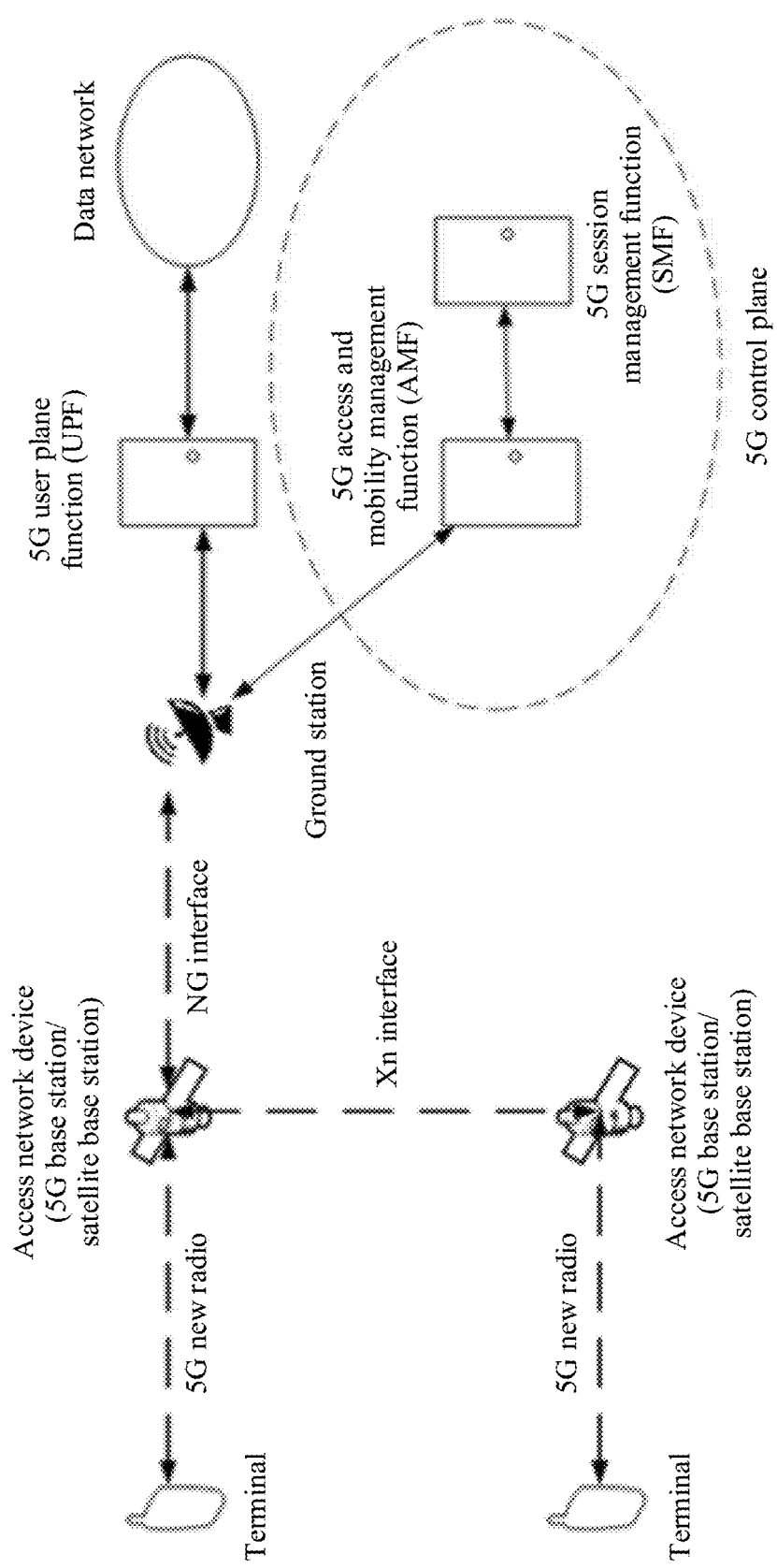
FIG. 1 is a schematic diagram of a network architecture to which an embodiment of the present disclosure may be applied.

Terms used in embodiments of the present disclosure are merely for the purpose of describing example embodiments, but are not intended to limit the present disclosure. The terms "a", "said" and "the" of singular forms used in embodiments and the appended claims of the present disclosure are also intended to include plural forms, unless otherwise specified in the context clearly. It should also be understood that, the term "and/or" used herein indicates and includes any or all possible combinations of one or more associated listed items. In addition, the terms "include", "have", and any variant thereof are intended to cover non-exclusive inclusion, for example, include a series of operations or units. Methods, systems, products, or devices are not necessarily limited to those operations or units that are literally listed, but may include other operations or units that are not literally listed or that are inherent to such processes, methods, products, or devices.

It should be understood that in the present disclosure, "at least one" refers to one or more, and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" usually represents an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

Technical solutions of the present disclosure may be applied to, but are not limited to, an evolved system from a 4th generation (4G) mobile communication system, a 5G mobile communication system, or a future mobile communication system, for example, may be applied to an LTE system or an NR system.

A terminal in embodiments of the present disclosure is a device that has a wireless transceiver function. The terminal may be deployed on land, including an indoor or outdoor device, a handheld device, or a vehicle-mounted device, may be deployed on water (for example, on a ship), or may be deployed in the air (for example, on an airplane, a balloon, or a satellite). The terminal may be a mobile phone, a tablet computer (pad), a computer with a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, a vehicle-mounted terminal in the Internet of vehicles, or the like.

The terminal may also be referred to as user equipment (UE), a wearable device, a mobile unit, a subscriber unit, a wireless unit, a remote unit, a mobile device, a wireless device, a wireless communication device, a remote device, a mobile subscriber station, a terminal device, an access terminal, a mobile terminal, a wireless terminal, a smart terminal, a remote terminal, a handheld device, a user agent, a mobile client, a client, or another proper term.

An access network (AN) device in the present disclosure is a device for connecting the terminal to a wireless network, and includes but is not limited to: a satellite base station, an evolved NodeB (eNB), a home base station (for example, Home Evolved NodeB, or Home NodeB, HNB), a baseband unit (BBU), a base station (gNodeB, gNB), a transmission/reception point (TRP), and a transmit point (TP), a device that provides a base station function in device-to-device (D2D) communication, a device that provides a base station function in Internet of vehicles communication, and a device that provides a base station function in machine-to-machine communication.

FIG. 1 is a schematic diagram of a network architecture to which an embodiment of the present disclosure may be applied. The network structure reflects an NTN application scenario in a 5G network. As shown in FIG. 1, the network architecture includes a terminal and an operator network. The operator network further includes a core network (CN) and a data network (DN). The terminal accesses the operator network by using an access network device.

The terminal is a device that supports 5G new radio, and may access a satellite base station through the 5G new radio and initiate a service such as a calling service and an Internet access service. The satellite base station may schedule radio resources for an accessed terminal and provide a reliable wireless transmission protocol, a data encryption protocol, or the like. The terminal on land may access the access network device through the 5G new radio, and the access network device is deployed on a satellite (which may also be referred to as a 5G base station or a satellite base station). The access network device may be connected to a terrestrial core network through a radio link (for example, an NG interface). An NG interface is an interface between an access network device and a core network, and is mainly configured for signaling interworking of an NAS or the like of the core network and transmit service data of a user. In addition, there is also a radio link (for example, an Xn interface) between satellite base stations to complete signaling interworking and user data transmission. With a wide coverage capability of satellites, operators can provide 5G commercial services in areas in which terrestrial network infrastructure is underdeveloped, to achieve 5G service continuity.

The signaling and service data between the satellite base station and the core network or the data network may be forwarded by a ground station (e.g., Gateway).

As a bearer network, the core network provides an interface to the data network, provides communication connection, mobility management, session management, user security authentication, charging, and policy control, and bears data services for the terminal. The core network includes a plurality of functional units, which can be classified into a control-plane functional entity and a data-plane functional entity. For example, the core network may include an access and mobility management function (AMF) that is responsible for functions such as user access management, security authentication, and mobility management, a session management function (SMF) that is responsible for session establishment and management, and a user plane function (UPF) that is responsible for functions such as user plane data transmission, traffic statistics, and lawful interception.

The data network may be an external network of an operator, or may be a network controlled by an operator, and is configured to provide a service for a user.

It should be noted that the network architecture described in the present disclosure is intended to describe the technical solutions in the present disclosure more clearly, but are not intended to limit the technical solutions provided in the present disclosure. A person of ordinary skill in the art may know that as the network architecture evolves and a new service scenario emerges, the technical solutions provided in the present disclosure are also applied to a similar technical problem.

Before the technical solutions of the present disclosure are described, the following first describes related terms in embodiments of the present disclosure.

Data: In the present disclosure, data may be understood as a transmit block (TB), a code block group (CBG), or other data. This is not limited in the present disclosure.

Transmission unit: In the present disclosure, a transmission unit is a time frequency resource used to bear data transmission or signaling transmission. Accordingly, a downlink transmission unit is used to bear downlink data transmission or downlink signaling transmission. For example, the downlink transmission unit may bear a physical downlink shared channel (PDSCH), a physical downlink control channel (PDCCH), or downlink control information (DCI). An uplink transmission unit is configured to bear uplink data transmission or uplink signaling transmission. For example, the uplink transmission unit may bear a physical uplink shared channel (PUSCH), a physical uplink control channel (PUCCH), or uplink control information UCI). When a transmission unit bears data/signaling, all time domain resources and/or frequency domain resources of the transmission unit may not necessarily be fully occupied by data/signaling.

A transmission unit may be one subframe, one time domain symbol, a plurality of time domain symbols, one slot, a plurality of slots, one mini-slot, a plurality of mini-slots, a combination of a mini-slot and a slot, or a combination of a symbol and a slot. A quantity of symbols or a length of a symbol of each transmission unit is not necessarily the same.

In this specification, for ease of description, technical solutions are described by using an example in which one transmission unit is one slot. In this description, a downlink transmission unit may also be referred to as a downlink slot or a downlink transmission slot, and an uplink transmission unit may also be referred to as an uplink slot or an uplink transmission slot.

In some embodiments, the transmission slot in this embodiment may be several symbols, a slot, a plurality of slots, or the like. In other words, the transmission slot in this embodiment is not limited to a slot (for example, a slot with a length of 1 ms) in a physical sense.

HARQ technology: A HARQ is a feedback technology that improves reliability of data transmission. In a case in which decoding is incorrect, a receive end stores received data in a HARQ buffer, and requests a transmit end to retransmit the data. The receive end performs soft combining on the retransmitted data and the previously received data, and then decodes the retransmitted data and the previously received data, to obtain a data packet that is more reliable than a data packet obtained through separate decoding. Then, the combined data packet is decoded. If decoding is correct, an ACK is fed back. If decoding is still incorrect, an NACK is fed back and a process of requesting retransmission and then performing soft combining is repeated.

A stop-and-wait protocol is used in a HARQ process to send data. In the stop-and-wait protocol, after transmitting a TB, the transmit end stops and waits for HARQ feedback information (ACK/NACK). The receive end may use 1-bit information to feed back an ACK or an NACK for the TB. However, the transmit end stops and waits for an acknowledgement after each transmission, and low throughput is caused. Therefore, a plurality of parallel stop-and-wait processes (which may also be referred to as HARQ processes)

are used, and each HARQ process needs an independent HARQ buffer at the receive end to perform soft combining on received data. When waiting for HARQ feedback information, the transmit end may continue to send data by using another HARQ process, so that data can be continuously transmitted.

After receiving one piece of HARQ feedback information, the transmit end needs to know a HARQ process corresponding to the HARQ feedback information, which is determined by using a fixed timing relationship between the HARQ feedback information and transmitted data. Asynchronous HARQ transmission is used in both an uplink and a downlink of NR. Retransmission may occur at any time and a HARQ process may be used in any sequence. A parameter is carried in DCI to indicate a HARQ process corresponding to currently transmitted data.

HARQ codebook: A HARQ codebook may also be referred to as a HARQ feedback codebook or HARQ bitmap information. The terminal may combine decoding results of a plurality of pieces of data transmitted by the access network device to form a HARQ codebook for feedback to the access network device. The plurality of pieces of data may come from different downlink transmission units and/or different codewords in MIMO and/or different carriers in carrier aggregation. A type of the HARQ codebook includes a semi-static type and a dynamic type. The present disclosure is mainly for a semi-static HARQ codebook. In this specification, the semi-static HARQ codebook may also be referred to as a HARQ semi-static codebook or a semi-static codebook.

In some embodiments, the HARQ codebook in this embodiment may further include a dynamic codebook. The dynamic codebook includes HARQ feedback information of a downlink transmission unit that needs HARQ feedback and preset information of a downlink transmission unit that does not need HARQ feedback. To be specific, for the downlink transmission unit that does not need HARQ feedback, the corresponding dynamic codebook may also carry the preset information. The preset information includes one or more of an acknowledgement ACK, a negative acknowledgement NACK, and a decoding result. It should be noted that the dynamic codebook described in this embodiment includes a dynamic codebook of a standard dynamic type and a dynamic codebook of an enhanced dynamic type.

In the present disclosure, the terminal supports a semi-static codebook. When the access network device schedules one or more transmit blocks for a downlink, and these transmit blocks may be from one or more bandwidth parts (BWP) of one carrier, or may be from one or more BWPs of a plurality of aggregated carriers, HARQ feedback information of these transmit blocks may be required to be multiplexed together to form a semi-static codebook for transmission through a PUSCH or a PUCCH of the terminal.

In an example, a size of the semi-static codebook may be determined from three dimensions: 1. a quantity of carriers configured by the access network device for the terminal by using signaling; 2. a quantity of downlink transmission units that need feedback on each carrier; and 3. a quantity of bits occupied by HARQ feedback information of each downlink transmission unit.

Figure 2A:
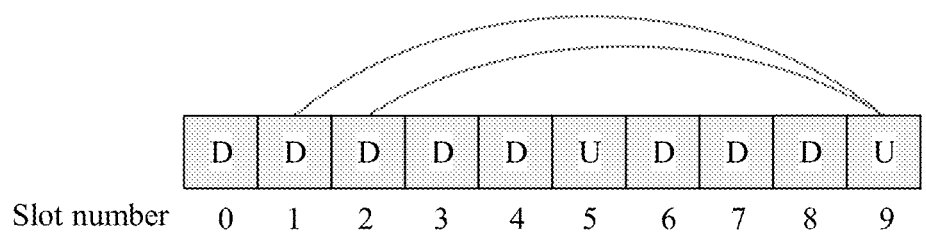
FIG. 2A is a diagram of an example of a slot allocation scenario.

For a specific carrier, there may be one or more downlink transmission slots that have a timing relationship with an uplink transmission slot of a current subframe. In other words, the uplink transmission slot is responsible for multiplexing and feedback of data receiving statuses of one or more downlink transmission slots. A specific status depends on a configuration of the access network device. For example, in an embodiment shown in FIG. 2A, a subframe includes 10 slots (whose slot numbers are 0 to 9). Slots whose slot numbers are 5 and 9 are both uplink transmission slots, and the remaining slots are all downlink transmission slots. In an uplink transmission slot whose slot number is 9, HARQ feedback is needed for data receiving statuses of downlink transmission slots whose slot numbers are 1 and 2. However, in an embodiment shown in FIG. 2C, the uplink transmission slot whose slot number is 9 may perform HARQ feedback for data receiving statuses of all downlink transmission slots.

Figure 2B:
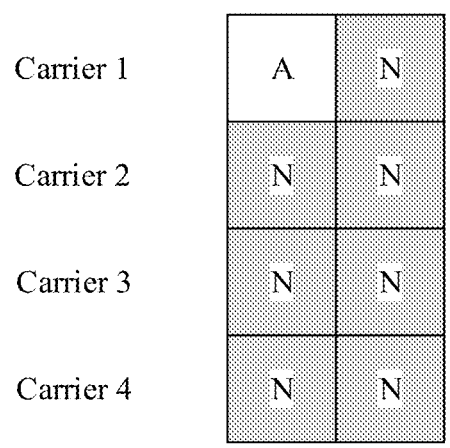
FIG. 2B is a diagram of an example of a HARQ codebook.
Figure 2C:
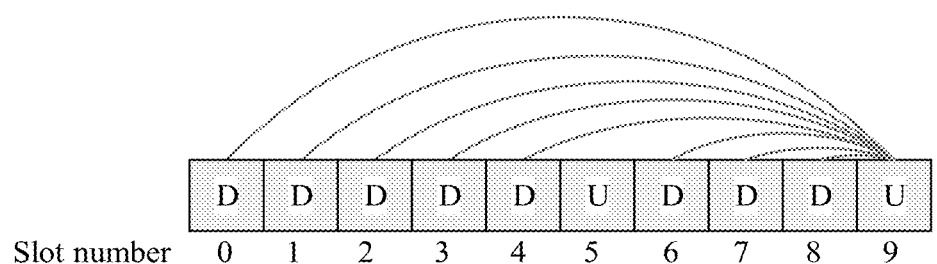
FIG. 2C is a diagram of an example of another slot allocation scenario.

For another example, the access network device configures four carriers numbered from 1 to 4 for the terminal. The carrier 1 is a primary serving cell (PCell), and other three carriers are secondary serving cells (SCell). All the four carriers are time division duplexing (TDD) carriers, and have a same ratio. In this case, the terminal needs to separately determine HARQ feedback information that needs to be sent in the PCell and each SCell, and concatenate the HARQ feedback information that needs to be sent in the PCell and each SCell to obtain a final HARQ semi-static codebook. Still refer to FIG. 2A as an example. In the uplink transmission slot whose slot number is 9, HARQ feedback is needed for data receiving statuses of the downlink transmission slots whose slot numbers are 1 and 2. If the terminal correctly receives data only in the downlink transmission slot whose slot number is 1 of the PCell, and the terminal does not correctly receive data or no data transmission is performed on another secondary carrier, an example of the HARQ semi-static codebook is shown in FIG. 2B. In FIG. 2B, different rows of the semi-static codebook may indicate HARQ feedback information of different downlink transmission slots of different carriers, and a first column of the semi-static codebook indicates HARQ feedback information of the downlink transmission slot whose slot number is 1. A second column of the semi-static codebook indicates HARQ feedback information of the downlink transmission slot whose slot number is 2. A indicates an ACK and occupies one bit, and N indicates an NACK and occupies one bit. If the ACK is denoted as "1", and the NACK is denoted as "0", the semi-static codebook may further be denoted as "1000000000". To be specific, "10" of the first two bits indicate HARQ feedback information in the PCell, and "00000000" of the last eight bits indicate HARQ feedback information in four SCells.

In an existing solution, when the terminal feeds back the semi-static codebook, feedback is always provided for all slots in a group of downlink transmission slots, regardless of whether the access network device schedules a transmit block for the terminal, or a quantity of transmit blocks that are scheduled. For example, the semi-static codebook provides feedback based on all downlink transmission slots corresponding to the current uplink transmission slot, and a size of the codebook does not dynamically change with actual data scheduling. If no data transmission is performed, an NACK is also fed back. For example, the uplink transmission slot whose slot number is 9 in FIG. 2A needs to reflect the HARQ feedback information of the two corresponding downlink transmission slots each time. For another example, the uplink transmission slot whose slot number is 9 in FIG. 2C needs to reflect HARQ feedback information of the eight corresponding downlink transmission slots each time. In view of this, overheads of resources of the semi-static codebook are high.

Even in a case of semi-static scheduling, even if some HARQ processes are disabled, HARQ feedback is also performed for data transmission corresponding to the disabled HARQ processes, and feedback information is an NACK. FIG. 3 shows an example of another semi-static codebook in which some HARQ processes are disabled. It can be seen that in the semi-static codebook, an ACK or an NACK (denoted as N/A in FIG. 3) is fed back, based on whether decoding is correct, for a slot in which data transmission is performed, and an NACK (denoted as N in FIG. 3) is fed back for a slot in which no data transmission is performed. In addition, an NACK (denoted as N in FIG. 3) is also fed back for data transmission in a slot corresponding to a disabled HARQ process. This wastes feedback resources, and in the NTN scenario, increases a communication delay and reduces a communication throughput rate.

To overcome the foregoing technical defects, an embodiment of the present disclosure provides a design of a semi-static codebook applicable to an NTN and a semi-static codebook feedback method. This can reduce feedback resource overheads, reduce a communication delay, and improve a communication throughput rate.

In a design of an embodiment of the present disclosure, a HARQ process of the terminal may be classified into a process that needs HARQ feedback (all TBs corresponding to this process need HARQ feedback) and a process that does not need HARQ feedback (all TBs corresponding to this process do not need HARQ feedback). Alternatively, different TBs in a same process may be classified into a TB that needs HARQ feedback and a TB that does not need HARQ feedback. The access network device properly configures downlink transmission slots for data transmission that needs HARQ feedback and a downlink transmission slot for data transmission that does not need HARQ feedback (slot configuration for short), and explicitly or implicitly indicates the slot configuration by using specified indication information. When generating a semi-static codebook, the terminal does not directly feed back the codebook based on all downlink transmission slots, but needs to feed back the codebook by using an enabled HARQ process or a disabled HARQ process indicated by the access network device or by using a slot configuration indicated by the access network device. In this way, a receiving status of downlink data that needs HARQ feedback is fed back in the codebook, and a receiving status of downlink data that does not need HARQ feedback is not fed back. This can reduce a size of the semi-static codebook for feedback and reduce feedback resource overheads. In addition, because feedback-retransmission processes of some processes or some data of the processes are reduced, data transmission processes of the processes or the data are more compact and fast. This can improve a communication throughput rate and reduce a communication delay.

In some embodiments, a design of the HARQ codebook in this embodiment may further include a dynamic codebook. The dynamic codebook includes HARQ feedback information of a downlink transmission unit that needs HARQ feedback and preset information of a downlink transmission unit that does not need HARQ feedback. To be specific, for the downlink transmission unit that does not need HARQ feedback, the corresponding dynamic codebook may also carry the preset information. The preset information includes one or more of an acknowledgement ACK, a negative acknowledgement NACK, and a decoding result. It should be noted that the dynamic codebook described in this embodiment includes a dynamic codebook of a standard dynamic type and a dynamic codebook of an enhanced dynamic type. It can be learned that a design of the dynamic codebook in this embodiment facilitates compatibility with an existing HARQ codebook, and compared with a size of the existing HARQ codebook, a size of the dynamic codebook designed in this embodiment may be reduced.

For ease of understanding of solutions, the following first describes a slot configuration, a design of a semi-static codebook for feedback, and content of indication information that are provided in an embodiment of the present disclosure.

(1) Slot configuration: During downlink data transmission, the access network device may consider, based on actual service conditions, data transmission that needs HARQ feedback (that is, a HARQ is enabled) and data transmission that does not need HARQ feedback (that is, a HARQ is disabled), and arrange corresponding downlink transmission slot allocation. The slot allocation may be allocation of downlink slots that are in downlink transmission slots and that are used to respectively transmit TBs with a HARQ enabled and TBs with a HARQ disabled. For a plurality of downlink slots corresponding to an uplink slot (that is, the uplink slot is responsible for feeding back receiving statuses of the plurality of downlink slots), the downlink slots may be classified into two types: a type of downlink slots used to allocate and transmit data corresponding to an enabled HARQ, and a type of downlink slots used to allocate and transmit data corresponding to a disabled HARQ.

For allocation locations of the two types of downlink slots in time domain, the slots used for data transmission with a HARQ enabled may be designed as consecutive downlink slots, or the slots used for data transmission with a HARQ disabled may be designed as consecutive downlink slots, so that the slots used for data transmission with a HARQ enabled are separated from the slots used for data transmission with a HARQ disabled. To be specific, downlink slots for data transmission with a HARQ enabled may be designed to occupy some centralized locations in the time domain, or downlink slots for data transmission with a HARQ disabled is designed to occupy some centralized locations in the time domain. It should be noted that uplink slots are not considered for the "consecutive downlink slots" in this specification. To be specific, for consecutive downlink slots, two downlink slots may be downlink slots whose slot numbers are consecutive, or one or more uplink slots may exist between the two downlink slots.

In a possible slot allocation case, a slot that needs HARQ feedback and a slot that does not need HARQ feedback are not alternately spaced through slot configuration.

Refer to FIG. 4. In an example, it is assumed that the plurality of downlink slots corresponding to the uplink slot whose slot number is 9 responsible for feedback include eight slots whose slot numbers are 0, 1, 2, 3, 4, 6, 7 and 8. In this case, the first four downlink slots (0, 1, 2, and 3) may all be designed for data transmission that needs HARQ feedback (that is, a HARQ is enabled), and the last four downlink slots (4, 6, 7, and 8) may all be designed for data transmission that does not need HARQ feedback (that is, a HARQ is disabled). As shown in FIG. 4, the slot numbers corresponding to the downlink slots with a HARQ enabled are consecutive, and there is an uplink slot (for example, an uplink slot whose slot number is 5 in FIG. 4) between downlink slots with a HARQ disabled in corresponding time domain.

Refer to FIG. 5. In another example, it is also assumed that the plurality of downlink slots corresponding to the uplink slot whose slot number is 9 responsible for feedback include eight slots whose slot numbers are 0, 1, 2, 3, 4, 6, 7 and 8. The first four downlink slots (0, 1, 2, and 3) may all be designed for data transmission that does not need HARQ feedback (that is, a HARQ is disabled), and the last four downlink slots (4, 6, 7, and 8) may all be designed for data transmission that needs HARQ feedback (that is, a HARQ is enabled). As shown in FIG. 5, the slot numbers corresponding to the downlink slots with a HARQ disabled are consecutive, and there is an uplink slot (for example, an uplink slot whose slot number is 5 in FIG. 4) between downlink slots with a HARQ enabled in corresponding time domain.

It should be noted that the foregoing examples are merely used to explain solutions in embodiments of the present disclosure instead of limiting solutions. In embodiments of the present disclosure, a quantity of downlink slots corresponding to a disabled HARQ, a quantity of downlink slots corresponding to an enabled HARQ, a location of an uplink slot in time domain, a slot number, and the like are not limited.

In another possible slot allocation case, a slot that needs HARQ feedback and a slot that does not need HARQ feedback are alternately spaced through slot configuration.

Figure 6:
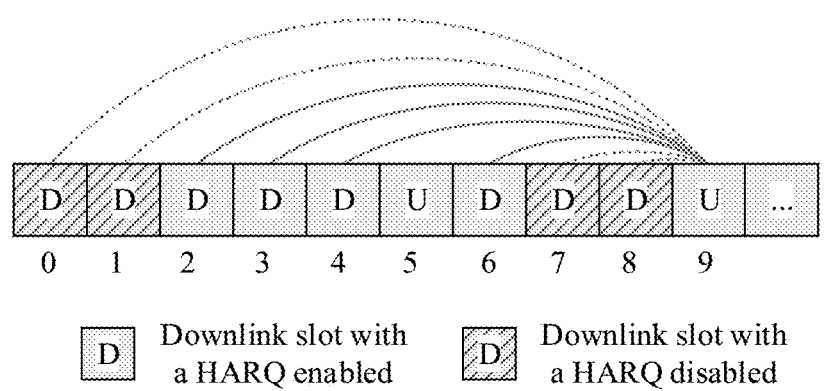
FIG. 6 is a diagram of an example of still another slot configuration scenario according to an embodiment of the present disclosure.

Refer to FIG. 6. In an example, it is assumed that the plurality of downlink slots corresponding to the uplink slot whose slot number is 9 responsible for feedback include eight slots whose slot numbers are 0, 1, 2, 3, 4, 6, 7 and 8. In this case, the four downlink slots (2, 3, 4, and 6) located in the middle may all be designed for data transmission that needs HARQ feedback (that is, a HARQ is enabled), and the four downlink slots (0, 1, 7, and 8) on two sides separately may all be designed for data transmission that does not need HARQ feedback (that is, a HARQ is disabled). As shown in FIG. 6, there is an uplink slot (for example, an uplink slot whose slot number is 5 in FIG. 6) between downlink slots with a HARQ enabled in corresponding time domain, and the slot numbers corresponding to the downlink slots with a HARQ disabled on the two sides are consecutive.

Figure 7:
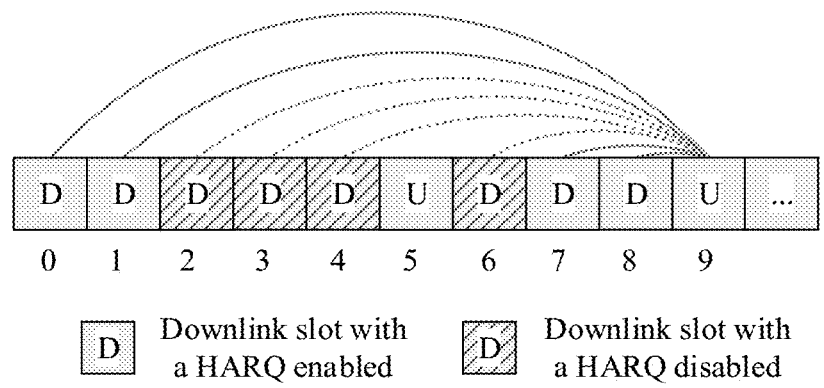
FIG. 7 is a diagram of an example of yet another slot configuration scenario according to an embodiment of the present disclosure.

Refer to FIG. 7. In another example, it is also assumed that the plurality of downlink slots corresponding to the uplink slot whose slot number is 9 responsible for feedback include eight slots whose slot numbers are 0, 1, 2, 3, 4, 6, 7 and 8. The four downlink slots (2, 3, 4, and 6) located in the middle may all be designed for data transmission that does not need HARQ feedback (that is, a HARQ is disabled), and the four downlink slots (0, 1, 7, and 8) on two sides separately may all be designed for data transmission that needs HARQ feedback (that is, a HARQ is enabled). As shown in FIG. 7, there is an uplink slot (for example, an uplink slot whose slot number is 5 in FIG. 7) between downlink slots with a HARQ disabled in corresponding time domain, and the slot numbers corresponding to the downlink slots with a HARQ enabled on the two sides are consecutive.

It should be noted that the foregoing examples are merely used to explain solutions in embodiments of the present disclosure instead of limiting solutions. In embodiments of the present disclosure, a quantity of downlink slots corresponding to a disabled HARQ, a quantity of downlink slots corresponding to an enabled HARQ, a location of an uplink slot in time domain, a slot number, and the like are not limited.

In embodiments of the present disclosure, allocation proportions of the two types of downlink slots (downlink slots used for data transmission with a HARQ disabled and downlink slots used for data transmission with a HARQ enabled) may be configured by a radio resource control (RRC) layer of the access network device based on a proportion of disabled HARQ processes, or may be configured by using a medium access control control element (MAC CE) of the access network device based on a data transmission status, or may be configured by using a level-based indication of the RRC layer and the MAC CE. Configuration manners are separately described below.

RRC layer configuration: In solutions of the present disclosure, a codebook (namely, a semi-static codebook) for semi-static scheduling may be configured by using RRC signaling. For slot configuration, RRC signaling may alternatively be used to configure which slots in downlink transmission slots need HARQ feedback and which slots do not need HARQ feedback. For example, if the semi-static codebook performs feedback through an uplink control channel, the semi-static codebook may be configured by using an RRC signaling related to the uplink control channel. If the semi-static codebook performs feedback through an uplink data channel, the semi-static codebook may be configured by using an RRC field related to the uplink data channel.

In an example of an embodiment of the present disclosure, a corresponding field (for example, SemiStatic-HARQ-codebook-Config) may be added to RRC signaling as indication information, to directly or indirectly indicate a slot configuration. For example, a value 1 of the field may indicate that a first slot (or a last slot) of a plurality of downlink slots corresponding to an uplink slot does not need HARQ feedback. For another example, a value 2 of the field may indicate that first two slots (or last two slots) of a plurality of downlink slots corresponding to an uplink slot do not need HARQ feedback.

In other words, indication information configured by using RRC signaling may indicate HARQ enabling or disabling states of only some downlink slots, and the terminal calculates HARQ enabling or disabling states of all downlink slots based on the indication information according to a rule.

It should be noted that the foregoing example is merely used to explain a solution of an embodiment of the present disclosure instead of limiting the present disclosure. A name of the field, a meaning of the parameter, and in which piece of RRC signaling the configuration field of the indication information is located are not limited in the present disclosure.

MAC layer configuration: A HARQ is implemented at a MAC layer. During downlink data transmission, the MAC layer may consider TB transmission that needs HARQ feedback (the HARQ is enabled) or does not need HARQ feedback (the HARQ is disabled), and arrange corresponding allocation of downlink transmission slots. Indication information of a complex slot may be configured by using signaling at the MAC layer, that is, the indication information can directly or indirectly indicate HARQ enabling or disabling states of all downlink slots.

In an example of an embodiment of the present disclosure, a corresponding field (for example, SemiStatic-HARQ-codebook-Config) may be added to MAC signaling as indication information, to directly or indirectly indicate a slot configuration. For example, as shown in Table 1, Index in the table indicates an identifier index, and LCID values indicate values of logical channel IDs (LCID). Index 0 corresponds to a parameter that is a common control channel (CCCH). Similarly, in signaling at a MAC layer, for example, a parameter of a slot allocation parameter "Slot pattern for HARQ" of a HARQ is added, and the parameter corresponds to Index 65. For example, for eight downlink slots, if the MAC layer indicates that a value "00111100" set to the parameter is used as a slot allocation mode of the eight downlink slots for data transmission, 1 indicates a slot that needs HARQ feedback, and 0 indicates a slot that does not need HARQ feedback. In this way, the terminal may directly learn, based on the indication information, which slots need HARQ feedback and which slots do not need HARQ feedback.

It should be noted that, in the foregoing example, although the solution is explained by using an example in which a location of the parameter in the signaling at the MAC layer corresponds to Index 65, this is not limited in the present disclosure. For example, the parameter may alternatively be located at another location (for example, the parameter may be inserted into any location from Index 0 to Index 64) in the signaling at the MAC layer.

TABLE 1

| Index | LCID values |
|---|---|
| 0 | CCCH |
| ... | ... |
| 65 | Slot pattern for HARQ (00111100) |

Configuration by using a level-based indication of the RRC layer and the MAC layer: In an embodiment of the present disclosure, RRC signaling may be designed for indication and configuration of some slots to allocate data transmission with a HARQ enabled and a HARQ disabled, and remaining slots are configured at the MAC layer. For example, for 10 downlink transmission slots, a first slot of first two slots is configured by using RRC to transmit data with a HARQ enabled, and in the remaining eight slots, the first two slots are configured at the MAC layer to transmit data with a HARQ enabled, and the last six slots are configured to transmit data with a HARQ disabled. After the configuration of slots by using the level-based indication of the RRC layer and the MAC layer, a slot configuration status may also be directly or indirectly indicated to the terminal by using the indication information.

(2) Process configuration: During downlink data transmission, one HARQ feedback manner is that an ACK/NACK feedback sequence is not in a one-to-one correspondence with a downlink slot, but in a one-to-one correspondence with a HARQ process. For example, feedback is performed, based on a sequence of HARQ processes, for a TB transmitted in each process. If one TB includes a plurality of CBs, feedback is further needed for the CBs based on levels of the CBs.

Figure 8A:
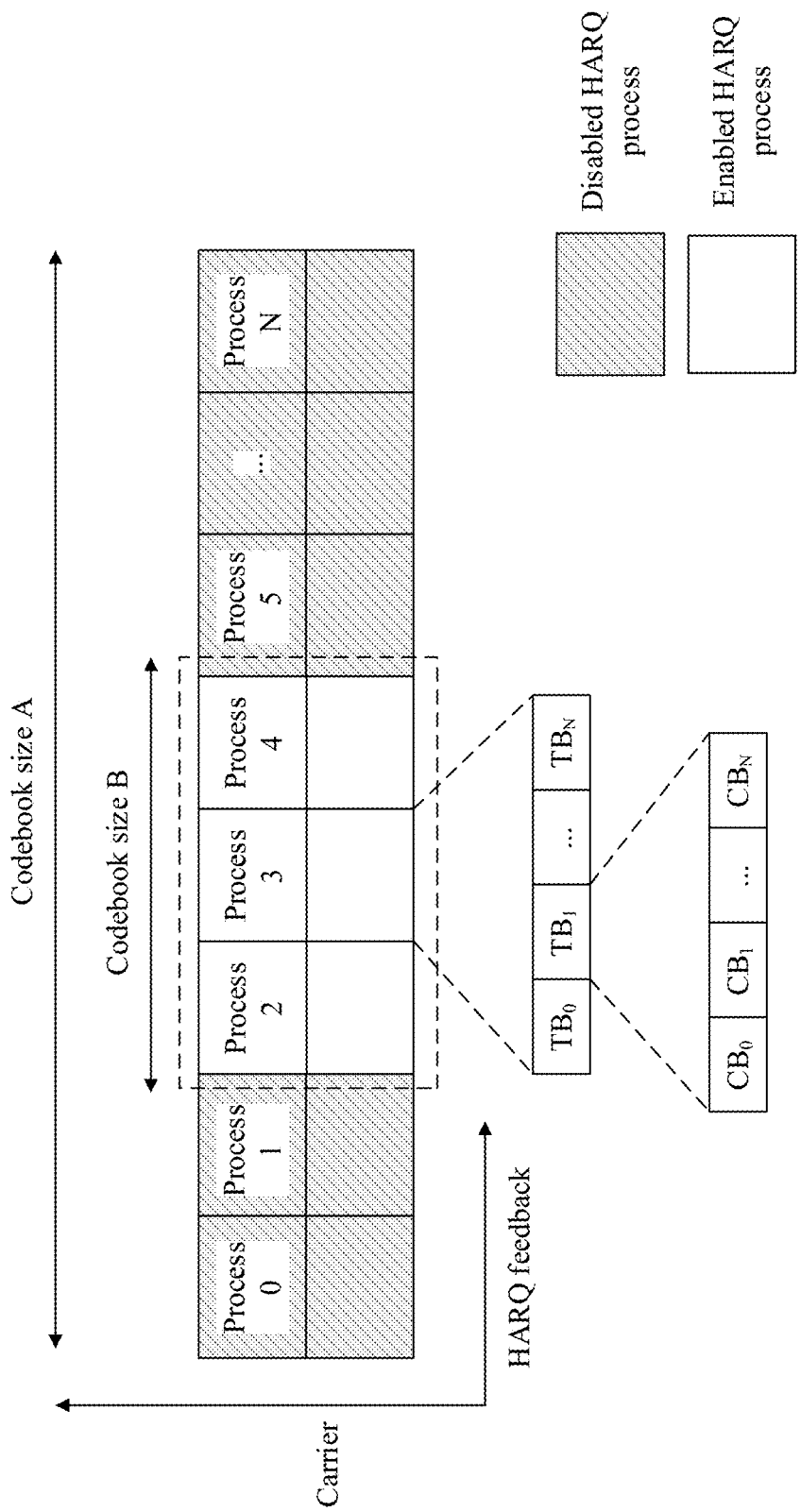
FIG. 8A is a diagram of an example of a codebook corresponding to a process configuration according to an embodiment of the present disclosure.

Refer to FIG. 8A. In an example, FIG. 8A is a schematic diagram of a process configuration according to an embodiment of the present disclosure. N processes (N is a positive integer) in FIG. 8A may be classified into two types: a type with a HARQ process enabled, and the other type with a HARQ process disabled. The access network device may indicate, by using indication information (for example, signaling such as RRC signaling, DCI, or a MAC CE), a process number corresponding to a disabled HARQ process. To be specific, the access network device indicates that a process 0, a process 1, and a process 5 to a process N are all used to transmit data that does not need HARQ feedback (that is, a HARQ is disabled), and indicates that a process 2 to a process 4 are all used to transmit data that needs HARQ feedback (that is, a HARQ is enabled). It should be noted that a process includes at least one downlink transmission unit, and the transmission unit may be used to bear a TB or a CB. Specifically, codebook feedback is performed sequentially based on a downlink transmission unit in each process.

It is assumed that in an NTN communication scenario, the terminal determines, based on the indication information of the access network device, the disabled HARQ processes, and directly skips the disabled HARQ processes during feedback. In other words, the terminal skips a process 0, a process 1, and a process 5 to a process N shown in FIG. 8A. For the process configuration shown in FIG. 8A, interaction between the terminal and the access network device may include the following operations.

The access network device sends indication information to the terminal, where the indication information indicates a process number corresponding to a disabled HARQ process.

The terminal performs ACK/NACK feedback for a TB or a CB in each process based on a sequence of HARQ process numbers. If it is detected that a current process number is a process number corresponding to a disabled HARQ process that is indicated by the indication information, the current process number is directly skipped, and no feedback is performed.

The access network device determines, based on the process number corresponding to a disabled HARQ process and a HARQ codebook fed back by a user, feedback in the codebook corresponding to data with a HARQ not disabled.

Therefore, a feedback manner in the embodiment shown in FIG. 8A can effectively reduce a size of the codebook.

Figure 8B:
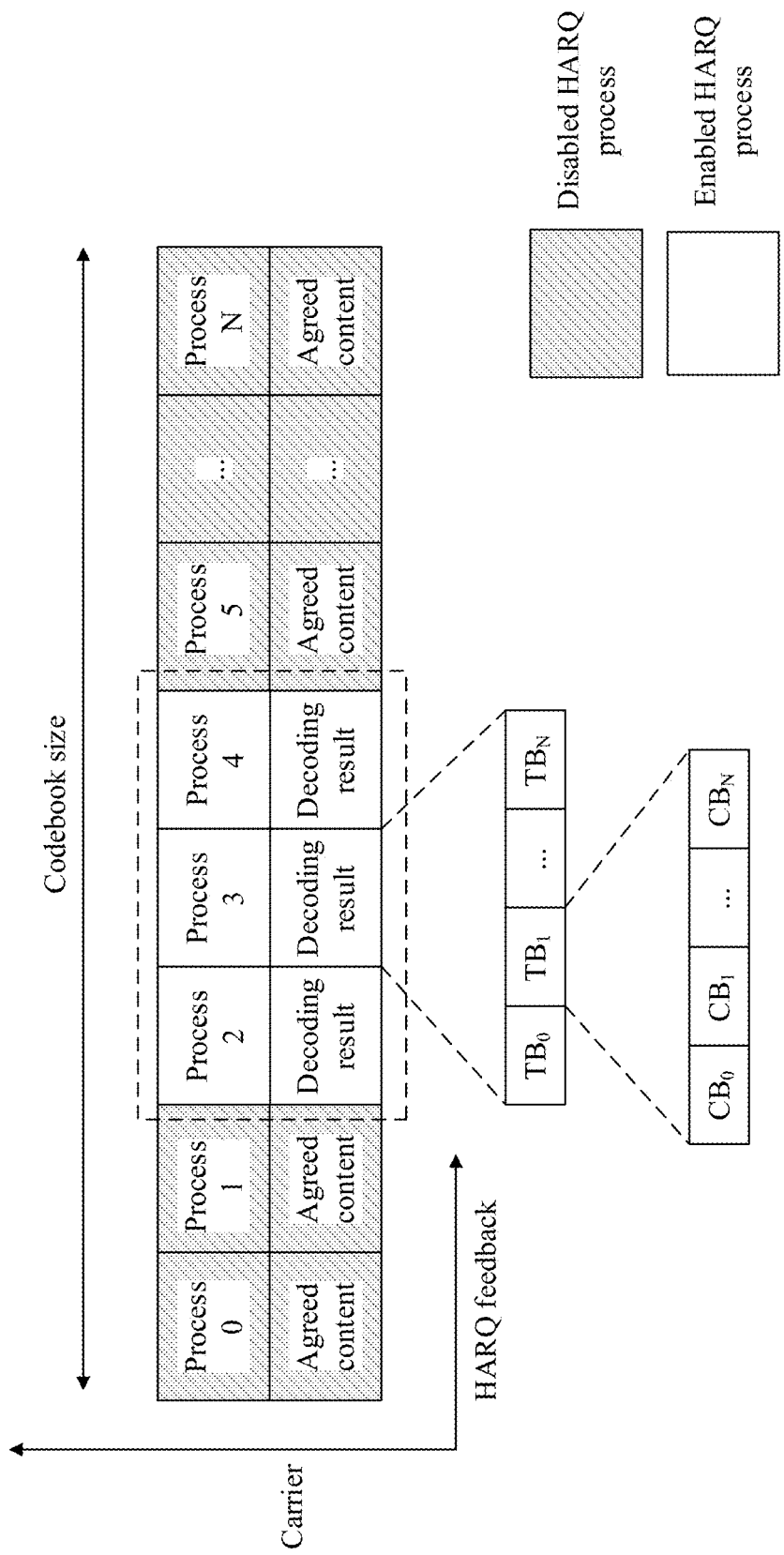
FIG. 8B is a diagram of an example of a codebook corresponding to another process configuration according to an embodiment of the present disclosure.

In some embodiments, the terminal determines a disabled HARQ process based on indication information of the access network device, and when the HARQ process is disabled during feedback, feeds back a default ACK or an ACK, as shown in FIG. 8B. FIG. 8B is a schematic diagram of another process configuration according to an embodiment of the present disclosure. For N processes (N is a positive integer) in FIG. 8B, it is assumed that a configuration of an enabled HARQ process is the same as a configuration of a disabled HARQ process. A difference lies in that for the disabled HARQ process, the terminal also feeds back a default ACK/NACK. For the enabled HARQ process, the terminal may perform feedback based on an actual decoding result.

For the process configuration shown in FIG. 8B, interaction between the terminal and the access network device may include the following operations.

The access network device sends indication information to the terminal, where the indication information indicates a process number corresponding to a disabled HARQ process.

The terminal performs ACK/NACK feedback for a TB or a CB in each process based on a sequence of HARQ process numbers. If it is detected that a current process number is a process number corresponding to a disabled HARQ process that is indicated by the indication information, agreed feedback content (for example, an ACK or an NACK) is fed back. If it is detected that the current process number is corresponding to an enabled HARQ process, feedback is performed based on a decoding result.

The access network device determines, based on the process number corresponding to a disabled HARQ process and a HARQ codebook fed back by a user, feedback in the codebook corresponding to data with a HARQ not disabled.

In some embodiments, for the process configuration shown in FIG. 8B, the following operations may be further executed in interaction between the terminal and the access network device.

The access network device sends indication information to the terminal, where the indication information indicates a process number corresponding to a disabled HARQ process.

The terminal performs ACK/NACK feedback for a TB or a CB in each process based on a sequence of HARQ process numbers. The terminal performs feedback on both an enabled HARQ process and the disabled HARQ process.

The access network device determines, based on the process number corresponding to a disabled HARQ process and a HARQ codebook fed back by a user and by reading feedback content corresponding to data of the not disabled HARQ process from the fed-back codebook, whether retransmission is needed. Feedback of the disabled HARQ process may not be processed or may be used to determine a decoding status, but no retransmission is performed.

Figure 9:
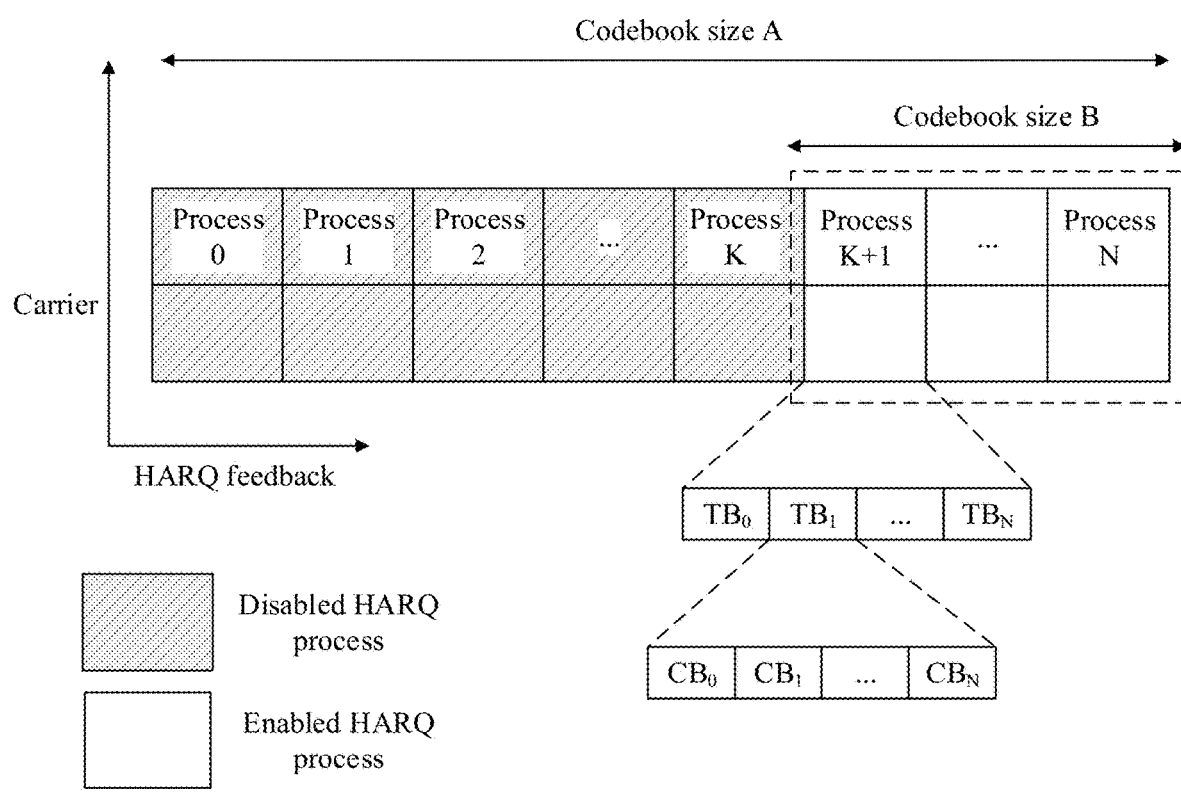
FIG. 9 is a diagram of an example of a codebook corresponding to still another process configuration according to an embodiment of the present disclosure.

Refer to FIG. 9. In another example, FIG. 9 is a schematic diagram of still another process configuration according to an embodiment of the present disclosure. N processes (N is a positive integer) in FIG. 9 may also be classified into two types: a type with a HARQ process enabled, and the other type with a HARQ process disabled. The access network device may indicate, by using signaling such as RRC signaling, DCI, or a MAC CE, a quantity of disabled HARQ processes by the terminal. To be specific, the access network device indicates to the terminal that a process 0 to a process K are all used to transmit data that does not need HARQ feedback (that is, a HARQ is disabled), and that a process K+1 to a process N are all used to transmit data that needs HARQ feedback (that is, a HARQ is enabled). It is assumed that in an NTN communication scenario, the terminal determines, based on indication information of the access network device, the disabled HARQ processes, and directly skips the disabled HARQ processes during feedback. In other words, the terminal skips the process 0 to the process K shown in FIG. 9. For the process configuration shown in FIG. 9, interaction between the terminal and the access network device may include the following operations.

The access network device sends indication information to the terminal, where the indication information indicates a quantity (it is assumed to be K) of disabled HARQ processes.

The terminal determines, based on the indication information, that first K HARQ processes are disabled; performs, based on a sequence of HARQ process numbers, ACK/NACK feedback for TBs or CBs in all remaining processes from a $(K+1)^{th}$ HARQ process; and if a disabled HARQ process is detected, directly skips performing feedback.

The access network device determines, based on the disabled HARQ processes and a HARQ codebook fed back by a user, feedback in the codebook corresponding to data with a HARQ not disabled.

(3) A design of a semi-static codebook for feedback: After a slot configuration is completed, the terminal determines a size of a codebook and HARQ information to be fed back based on a slot allocation and a data receiving status of each slot.

Figure 10:
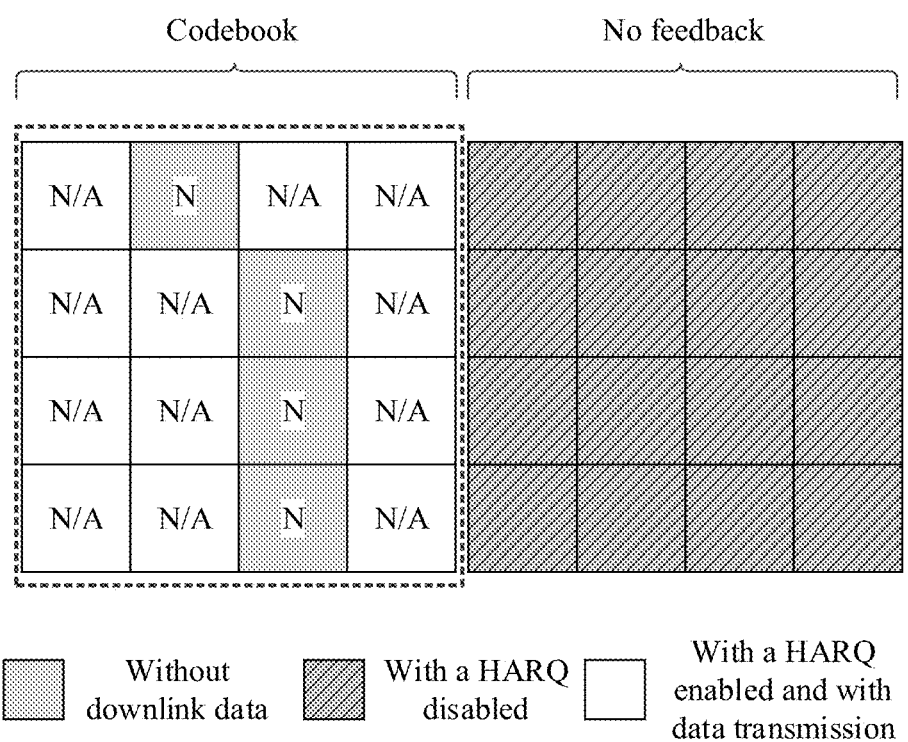
FIG. 10 is a diagram of an example of a semi-static codebook according to an embodiment of the present disclosure.

FIG. 10 shows a semi-static codebook corresponding to the slot configuration in the embodiment shown in FIG. 4. The codebook corresponds to eight downlink transmission slots and four carriers. Based on the slot configuration, a slot that needs HARQ feedback and a slot that does not need HARQ feedback are not alternately spaced. For HARQ information of all pieces of data that need HARQ feedback in four slots corresponding to first four columns in the codebook, a bitmap may be fed back. Last four columns correspond to only slots that do not need HARQ feedback. Therefore, no bitmap is fed back. To be specific, when the codebook is designed, only the first half (namely, a part in a dashed box in FIG. 10) of bitmap information needs to be extracted to form the final semi-static codebook (occupying 4×4=16 bits). In comparison with an original codebook (8×4=32 bits), this can greatly reduce a size of the codebook and reduce consumption of feedback resources. In addition, because feedback-retransmission processes of some processes or some data (corresponding to the last four columns of slots) of the processes are reduced, data transmission processes of the processes or the data are more compact and fast. This can improve a communication throughput rate and reduce a communication delay.

Figure 11:
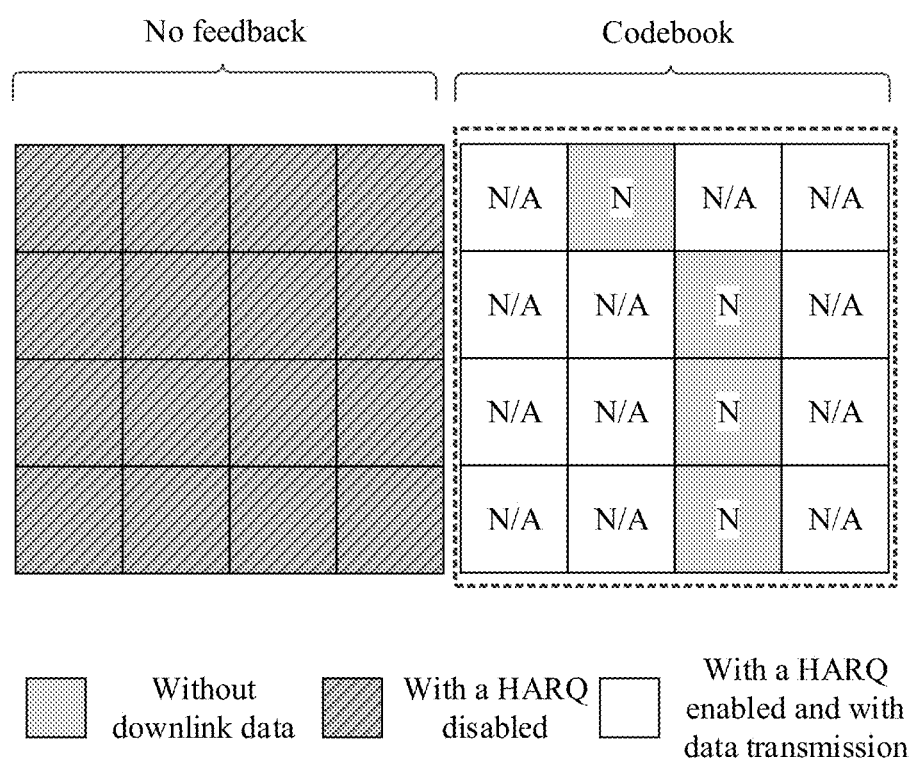
FIG. 11 is a diagram of an example of another semi-static codebook according to an embodiment of the present disclosure.

FIG. 11 shows another semi-static codebook corresponding to the slot configuration in the embodiment shown in FIG. 5. The codebook corresponds to eight downlink transmission slots and four carriers. Based on the slot configuration, a slot that needs HARQ feedback and a slot that does not need HARQ feedback are not alternately spaced. For HARQ information of all pieces of data that need HARQ feedback in four slots corresponding to last four columns in the codebook, a bitmap may be fed back. First four columns correspond to only slots that do not need HARQ feedback. Therefore, no bitmap is fed back. To be specific, when the codebook is designed, only the last half (namely, a part in a dashed box in FIG. 11) of bitmap information needs to be extracted to form the final semi-static codebook (occupying 4×4=16 bits). In comparison with an original codebook (8×4=32 bits), this can greatly reduce a size of the codebook and reduce consumption of feedback resources. In addition, because feedback-retransmission processes of some processes or some data (corresponding to the first four columns of slots) of the processes are reduced, data transmission processes of the processes or the data are more compact and fast. This can improve a communication throughput rate and reduce a communication delay.

Figure 12:
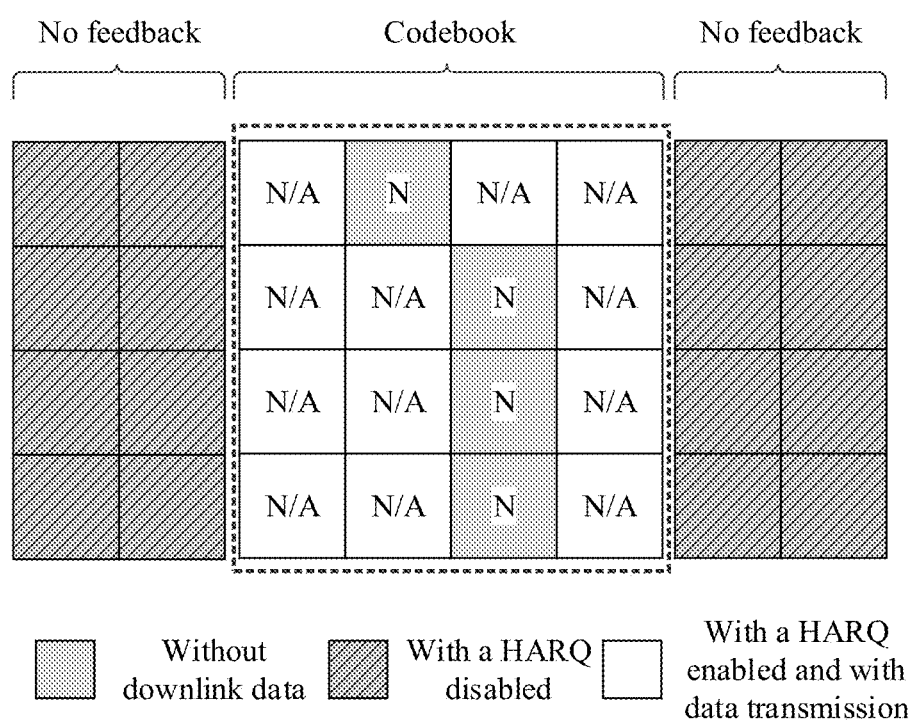
FIG. 12 is a diagram of an example of still another semi-static codebook according to an embodiment of the present disclosure.

FIG. 12 shows still another semi-static codebook corresponding to the slot configuration in the embodiment shown in FIG. 6. The codebook corresponds to eight downlink transmission slots and four carriers. Based on the slot configuration, a slot that needs HARQ feedback and a slot that does not need HARQ feedback are alternately spaced. For HARQ information of all pieces of data that need HARQ feedback in four slots corresponding to four columns in the middle of the codebook, a bitmap may be fed back. Two columns located on two sides of the codebook respectively correspond to only slots that do not need HARQ feedback. Therefore, no bitmap is fed back. To be specific, when the codebook is designed, only the four columns in the middle (namely, a part in a dashed box in FIG. 12) of bitmap information needs to be extracted to form the final semi-static codebook (occupying 4×4=16 bits). In comparison with an original codebook (8×4=32 bits), this can greatly reduce a size of the codebook and reduce consumption of feedback resources. In addition, because feedback-retransmission processes of some processes or some data (corresponding to the two columns of slots on the two sides of the codebook separately) of the processes are reduced, data transmission processes of the processes or the data are more compact and fast. This can improve a communication throughput rate and reduce a communication delay.

Figure 13:
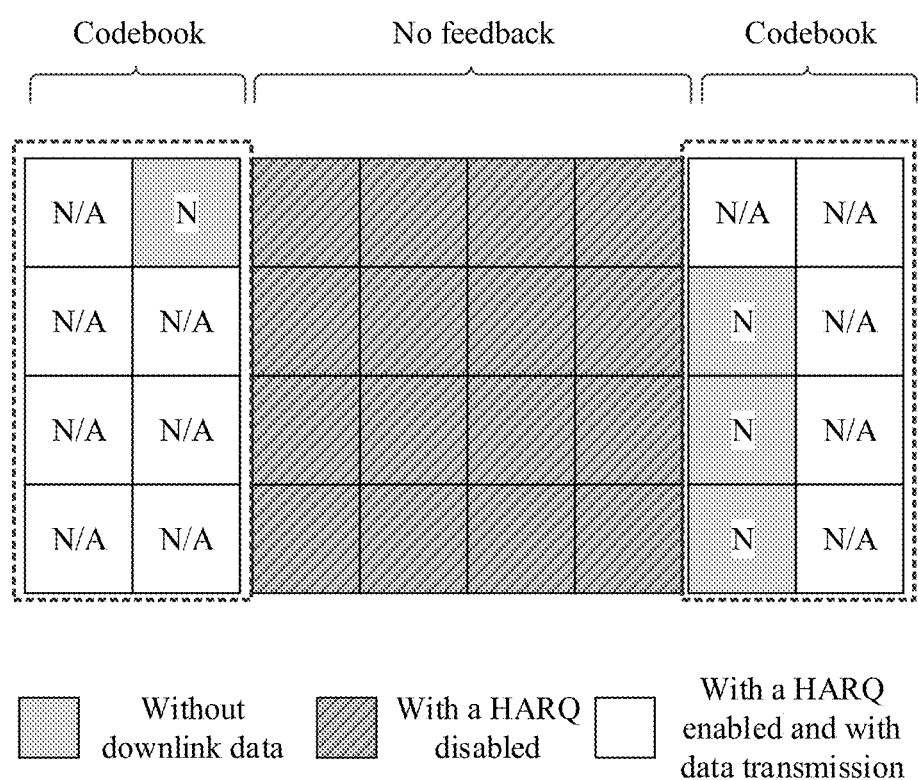
FIG. 13 is a diagram of an example of yet another semi-static codebook according to an embodiment of the present disclosure.

FIG. 13 shows yet another semi-static codebook corresponding to the slot configuration in the embodiment shown in FIG. 7. The codebook corresponds to eight downlink transmission slots and four carriers. Based on the slot configuration, a slot that needs HARQ feedback and a slot that does not need HARQ feedback are alternately spaced. For HARQ information of all pieces of data that does not need HARQ feedback in four slots corresponding to four columns in the middle of the codebook, a bitmap is not fed back. Two columns located on two sides of the codebook respectively correspond to only slots that need HARQ feedback. Therefore, a bitmap may be fed back. To be specific, when the codebook is designed, only the two columns on the two sides separately (namely, a part in a dashed box in FIG. 13) of bitmap information needs to be combined to form the final semi-static codebook (occupying 4×4=16 bits). In comparison with an original codebook (8×4=32 bits), this can greatly reduce a size of the codebook and reduce consumption of feedback resources. In addition, because feedback-retransmission processes of some processes or some data (corresponding to the four columns of slots in the middle of the codebook) of the processes are reduced, data transmission processes of the processes or the data are more compact and fast. This can improve a communication throughput rate and reduce a communication delay. It should be noted that although the technical solutions in all the foregoing embodiments are explained by using four carriers as an example, a quantity of carriers is not limited in embodiments of the present disclosure.

It should be further noted that, in the foregoing examples, although a carrier is used as a feedback granularity for each column of the codebook, this is not limited in embodiments of the present disclosure. In other words, in some embodiments, each column of the codebook may alternatively be of another granularity. For example, each column may further indicate retransmission of a code block group, or retransmission of a plurality of data streams/transmit blocks in a MIMO case.

Figure 14:
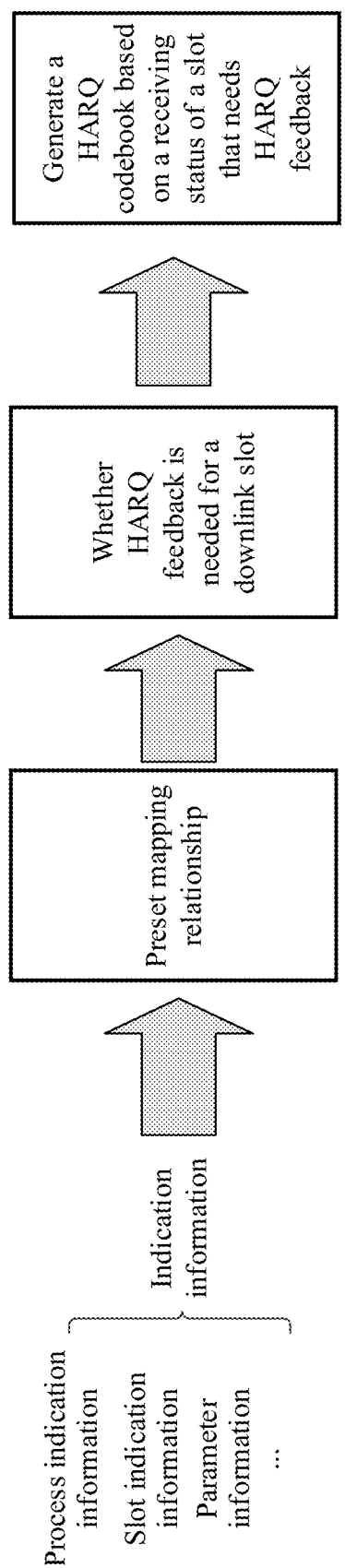
FIG. 14 is a schematic flowchart of generating a semi-static codebook according to an embodiment of the present disclosure.

(4) Indication information: Refer to FIG. 14. In technical solutions of the present disclosure, indication information may be used to determine whether HARQ feedback is needed for a transmit block transmitted in a plurality of downlink slots. There is a mapping relationship between the indication information and at least one downlink slot. After receiving the indication information, the terminal may determine, based on the mapping relationship, at least one downlink slot that needs HARQ feedback, and generate a semi-static codebook based on a data receiving status of the at least one downlink slot that needs HARQ feedback.

In some embodiments, the access network device first sends the indication information to the terminal in a broadcast manner (specific signaling may be in a system message system information block (SIB)), or in an RRC signaling unicast manner (for example, during connection establishment), or in an RRC signaling multicast manner, or in a MAC signaling unicast manner, or in a MAC signaling multicast manner, or in a DCI manner.

For example, when the terminal accesses the access network device and establishes an RRC connection, the access network device may send the indication information to the terminal by using the RRC signaling. In a semi-static scheduling period, the terminal may generate a semi-static codebook and perform feedback based on the indication information. This can reduce occupation of communication resources, improve a communication throughput rate, and reduce a communication delay.

For another example, in a process in which the terminal performs service communication with the access network device, the access network device may send the indication information to the terminal by using the RRC signaling or the MAC signaling based on a service status and a network traffic status in real time. The terminal may generate a semi-static codebook and perform feedback based on the indication information. This can reduce occupation of communication resources, improve a communication throughput rate, and reduce a communication delay.

For another example, for a plurality of terminals in a cell, or a plurality of terminals that have a same or similar service requirement, the access network device may send the indication information to the plurality of terminals in a broadcast or multicast manner. In a semi-static scheduling period of each terminal, each terminal may generate a semi-static codebook and perform feedback based on the indication information. This can improve communication convenience, meet a service requirement of each terminal, improve a communication throughput rate, and reduce a communication delay.

In some embodiments, the indication information includes process indication information. There is a mapping relationship between the process indication information and a HARQ process that needs HARQ feedback, and there is a mapping relationship between the HARQ process that needs HARQ feedback and the at least one downlink slot.

HARQ processes may be classified into two types: a process that needs HARQ feedback (which may also be referred to as a HARQ enabled) and a process that does not need HARQ feedback (which may also be referred to as a HARQ disabled). A process that needs HARQ feedback indicates a process that needs ACK/NACK feedback, and a process that does not need HARQ feedback indicates a process that does not need ACK/NACK feedback.

In an example, a quantity of HARQ processes is usually fixed, for example, 8, 16, or 32. Each HARQ process has a corresponding process number (or referred to as an identifier). In this case, each piece of indication information may directly include a process number corresponding to an enabled HARQ process or a disabled HARQ process.

In another example, the indication information may include an indication parameter of a process number corresponding to an enabled HARQ process or a disabled HARQ process. For example, a parameter 0 corresponds to enabling or disabling of a group of process numbers, and a parameter 1 corresponds to enabling or disabling of another group of process numbers, thereby reducing signaling overheads.

In still another example, the indication information may include an index number of a process number corresponding to an enabled HARQ process or a disabled HARQ process, and a process index table is configured in the terminal. In this case, the terminal may determine, by querying the table by using the index number, the process number corresponding to an enabled HARQ process or a disabled HARQ process, thereby reducing signaling overheads.

In yet another example, the indication information may include a quantity N (N is greater than or equal to 1 and is less than or equal to a maximum quantity of processes) of enabled or disabled HARQ processes. In this case, the terminal determines, based on the quantity and a sequence of process numbers, that first N or last N HARQ processes are disabled.

In still yet another example, the indication information may include a proportion N % of enabled or disabled HARQ processes. In this case, the terminal determines, based on the proportion and a sequence of process numbers, that first N % or last N % HARQ processes in all processes are disabled.

After obtaining data transmitted in a plurality of candidate downlink transmission slots, the terminal may first decode the data transmitted in the downlink transmission slots. If it is found that a HARQ process number indicated by control information (for example, DCI) in the data corresponds to a disabled HARQ process, neither an ACK nor an NACK is generated after decoding. If it is found that the HARQ process number indicated by the control information (for example, DCI) in the data corresponds to a not disabled HARQ process, an ACK or an NACK is accordingly generated based on whether decoding is correct. For the not disabled HARQ process, if no data transmission is performed in a slot, an NACK may be fed back accordingly. To be specific, after decoding, the terminal determines a size of a codebook, and knows which slot or data needs feedback and which slot or data does not need feedback, to generate a corresponding semi-static codebook.

In some embodiments, the indication information includes transmission unit indication information. The transmission unit indication information directly or indirectly indicates at least one downlink slot that needs HARQ feedback and/or at least one downlink slot that does not need HARQ feedback.

In an example, a quantity of HARQ processes is usually fixed, for example, 8, 16, or 32. Each process may use one or more slots for data transmission. At one time of data transmission, a slot corresponding to each process may also be determined. In this case, each piece of indication information may directly include a slot corresponding to a process number corresponding to an enabled HARQ process and/or a disabled HARQ process.

For example, indication information "00111100" is used as a slot allocation mode of eight downlink slots for data transmission, where 1 indicates a slot that needs HARQ feedback, and 0 indicates a slot that does not need HARQ feedback. In this way, the terminal may directly learn, based on the indication information, which slots need HARQ feedback and which slots do not need HARQ feedback.

In another example, the indication information may include an indication parameter of a slot with a HARQ enabled or disabled. For example, a parameter 0 corresponds to enabling or disabling of a group of slots, and a parameter 1 corresponds to enabling or disabling of another group of slots, thereby reducing signaling overheads.

In still another example, the indication information may include an index number, and a slot allocation index table is configured in the terminal. In this case, the terminal may determine, by querying the table by using the index number, slots that need HARQ feedback and slots that do not need HARQ feedback, thereby reducing signaling overheads.

TABLE 2

| | |
|---|---|
| 0 | 00001111 |
| 1 | 11000011 |
| 2 | 11110000 |
| 3 | 00111100 |
| ... | ... |

In yet another example, the indication information may include a quantity N (N is greater than or equal to 1 and is less than or equal to a maximum quantity of slots) of slots with a HARQ enabled or disabled. In this case, the terminal determines, based on the quantity and a sequence of slot numbers of downlink slots, that first N or last N slots are with a HARQ disabled (that is, HARQ feedback is not needed), thereby reducing table storage overheads.

In still yet another example, the indication information may include a proportion N % of slots with a HARQ enabled or disabled. In this case, the terminal determines, based on the proportion and a sequence of slot numbers, that first N % or last N % downlink slots in all downlink slots are with a HARQ disabled (that is, HARQ feedback is not needed), thereby reducing table storage overheads.

When the transmission unit indication information indicates a downlink slot that does not need HARQ feedback, after obtaining a plurality of candidate downlink slots, the terminal determines a downlink slot other than a downlink slot that does not need HARQ feedback in these downlink transmission slots as a downlink slot that needs HARQ feedback, decodes data transmitted in the downlink slot that needs HARQ feedback, generates an ACK or an NACK based on whether decoding is correct, and does not perform feedback for data transmitted in a downlink slot that does not need HARQ feedback. If no data transmission is performed in some downlink slots that need HARQ feedback, an NACK is also fed back.

In a further example, the indication information includes downlink assignment indicator (DAI) information. For example, the access network device assists the UE in performing HARQ-ACK feedback by adding a DAI field in downlink control information DCI. A DAI may be understood as a counter, which counts for downlink scheduling in same slot feedback. For example, when the terminal detects downlink data scheduled by using the DCI, but does not detect that a corresponding DAI is updated, the terminal does not perform feedback for the data in a same HARQ codebook. When detecting that a count of the DAI is increased by one, the terminal performs corresponding data feedback. Feedback may be performed for a plurality of PDSCHs in a same HARQ codebook. It may be understood that, corresponding data feedback performed by the terminal based on the detected DAI is dynamic feedback, and a corresponding HARQ codebook is also a HARQ codebook of a dynamic type.

Figure 15:
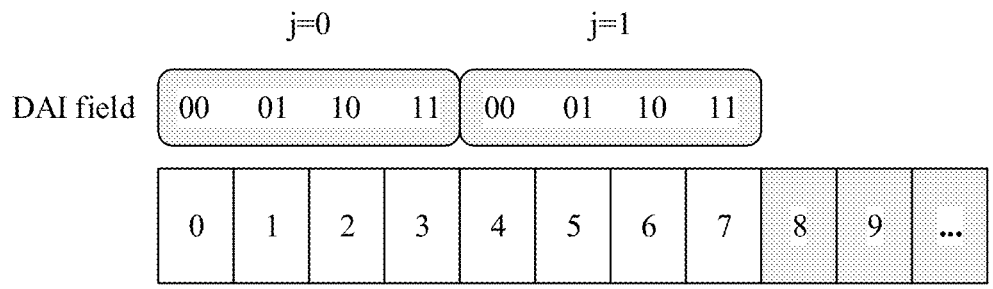
FIG. 15 is a schematic diagram of a relationship between DAI information and a slot according to an embodiment of the present disclosure.

For example, it is usually assumed that a DAI occupies two bits, and a maximum quantity of pieces of scheduled downlink data indicated by the DAI is four. When a quantity of pieces of scheduled downlink data is greater than four, the DAI starts cyclic counting from "00". In this case, the terminal needs to identify this case, and correctly perform counting to determine a quantity of bits in final feedback. In some embodiments, the DAI also determines a location of a HARQ-ACK bit, as shown in FIG. 15. FIG. 15 is a schematic diagram of a relationship between DAI information and a slot according to an embodiment of the present disclosure. A DAI counts for two rounds, and j is a parameter calculated by a user according to a rule. When j is not returned to zero, it is considered that the count of the DAI increases. It can be learned that a slot 0 to a slot 7 correspond to a transmission unit 0 to a transmission unit 7, and the end user feeds back eight ACKs or NACKs in a slot 8.

Figure 16:
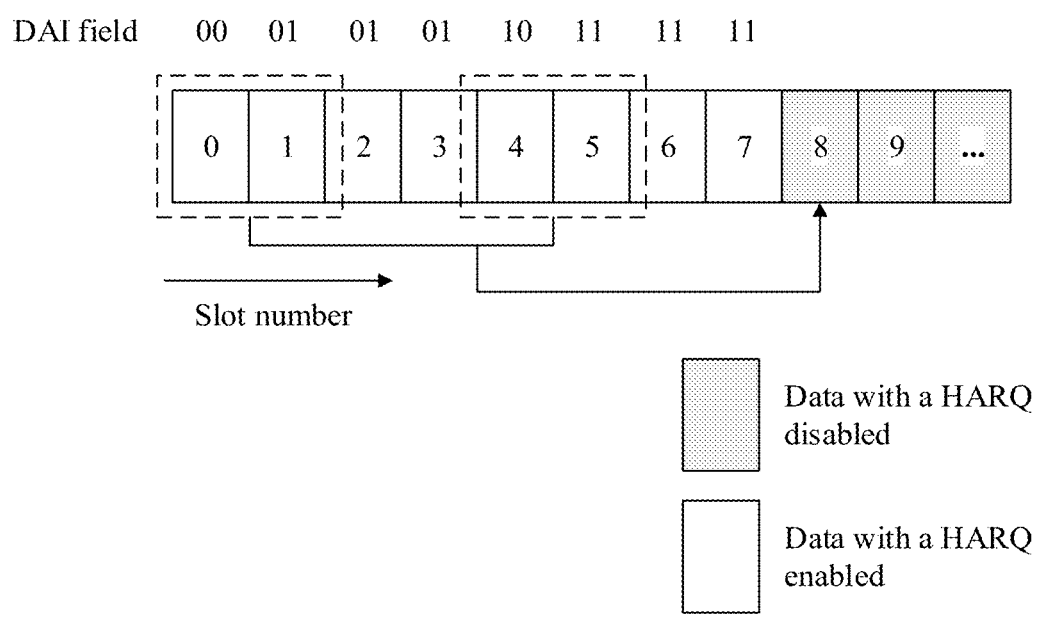
FIG. 16 is a schematic diagram of a slot indicating, by using a DAI, that a HARQ is enabled or disabled according to an embodiment of the present disclosure.

FIG. 16 is a schematic diagram of a slot indicating, by using a DAI, that a HARQ is enabled or disabled according to an embodiment of the present disclosure. A DAI starts cyclical counting from "00". It is assumed that a slot 0 and a slot 1 are slots with a HARQ enabled, a DAI corresponding to the slot 0 is 00, and a DAI corresponding to the slot 1 is 01. It is assumed that a slot 2 and a slot 3 are slots with a HARQ disabled. In this case, the DAI does not continue to count, that is, the DAI is not updated. In this case, a DAI corresponding to the slot 2 and a DAI corresponding to the slot 3 remains 01. It is assumed that a slot 4 and a slot 5 are slots with a HARQ enabled. In this case, the DAI continues to count, and a DAI corresponding to the slot 4 is 10, and a DAI corresponding to the slot 5 is 11. It is assumed that a slot 6 and a slot 7 are slots with a HARQ disabled. In this case, the DAI does not continue to count, that is, the DAI is not updated. In this case, a DAI corresponding to the slot 6 and a DAI corresponding to the slot 7 remains 11. It can be learned that for a total of eight slots from the slot 0 to the slot 7, the terminal may determine, based on the DAI in the indication information, slots in which HARQ is enabled and slots in which HARQ is disabled, to determine slots in which feedback is performed.

In some embodiments, it is assumed that in an NTN communication scenario, the terminal determines a process number corresponding to a disabled HARQ process based on indication information of the access network device. In this case, the terminal performs feedback for downlink data based on received downlink data and a count value of a DAI.

In some embodiments, the DAI does not count for data with a HARQ disabled, and the terminal skips feedback for data with a HARQ disabled when performing feedback for the downlink data. In some embodiments, although the DAI does not count for data with a HARQ disabled, when the terminal encounters data in which the DAI does not count or encounters data with a HARQ disabled, the terminal directly feeds back agreed content, for example, an ACK or a NACK. In some embodiments, although the DAI does not count for data with a HARQ disabled, the terminal feeds back an actual decoding result during feedback. Correspondingly, the access network device determines, based on the process number corresponding to a disabled HARQ process and a HARQ codebook fed back by a user, and by reading feedback content corresponding to data with a HARQ not disabled from the fed-back codebook, whether retransmission is needed. Feedback of a disabled HARQ process may not be processed or may be used to determine a decoding status, but no retransmission is performed.

In some embodiments, the DAI counts for data with a HARQ disabled, but the terminal skips feedback for data with a HARQ disabled when performing feedback for the downlink data. In some embodiments, the DAI counts for data with a HARQ disabled, and the terminal feeds back an actual decoding result during feedback. Correspondingly, the access network device determines, based on the process number corresponding to a disabled HARQ process and a HARQ codebook fed back by a user, and by reading feedback content corresponding to data with a HARQ not disabled from the fed-back codebook, whether retransmission is needed. Feedback of a disabled HARQ process may not be processed or may be used to determine a decoding status, but no retransmission is performed.

In some embodiments, the indication information includes parameter information. The parameter information is used to determine the at least one target transmission unit by using a preset algorithm.

In an example, the terminal may obtain a related parameter in the indication information sent by the access network device. The parameter does not directly indicate a process number or a slot, but the terminal can still determine, by using a preset algorithm and by using the parameter, a slot that needs HARQ feedback or a slot that does not need HARQ feedback.

In another example, the terminal may alternatively calculate by using a related parameter in RRC signaling sent by the access network device for determining all candidate downlink transmission slots, a parameter carried in the indication information, and a preset algorithm, and determine a slot that needs HARQ feedback or a slot that does not need HARQ feedback.

The terminal decodes data transmitted by a downlink slot that needs HARQ feedback, generates an ACK or an NACK based on whether decoding is correct, and does not perform feedback for data transmitted in a downlink slot that does not need HARQ feedback. If no data transmission is performed in some downlink slots that need HARQ feedback, an NACK is also fed back. Based on the foregoing descriptions, the following provides some HARQ codebook feedback methods in embodiments of the present disclosure.

For convenience, the method embodiments described below are expressed as a combination of a series of action operations. However, a person skilled in the art should understand that specific implementations of technical solutions of this disclosure are not limited to a sequence of the described series of action operations.

Figure 17:
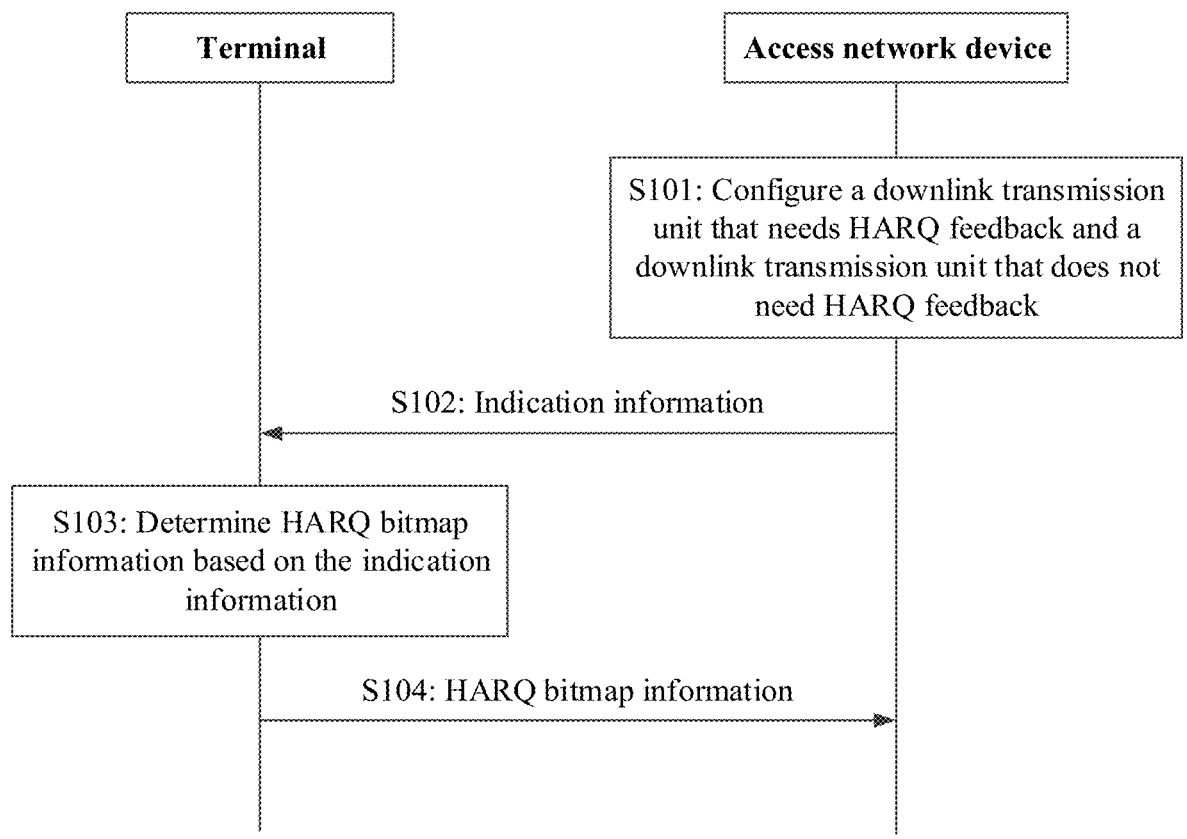
FIG. 17 is a schematic flowchart of codebook feedback according to an embodiment of the present disclosure.

FIG. 17 is a schematic flowchart of a HARQ codebook feedback method according to an embodiment of the present disclosure. The method is described from perspectives of two sides: a terminal and an access network device. The method includes but is not limited to the following operations.

S101: An access network device configures a downlink transmission unit that needs HARQ feedback and a downlink transmission unit that does not need HARQ feedback.

In the present disclosure, a downlink transmission unit may be one subframe, one time domain symbol, a plurality of time domain symbols, one slot, a plurality of slots, one mini-slot, a plurality of mini-slots, or a combination of a mini-slot and a slot, or a combination of a symbol and a slot, or a combination of a mini-slot and a slot, which is used for downlink transmission.

The "downlink transmission unit that needs HARQ feedback" is a downlink transmission unit used to transmit data that needs HARQ feedback, and the "downlink transmission unit that does not need HARQ feedback" is a downlink transmission unit used to transmit data that does not need HARQ feedback, or a downlink transmission unit whose HARQ feedback information is preset information in downlink transmission units. The preset information is one or more of an acknowledgement ACK, a negative acknowledgement NACK, and a decoding result. In the present disclosure, for ease of description, a downlink transmission unit that needs HARQ feedback and whether to perform retransmission is determined based on HARQ feedback information may also be referred to as a target transmission unit. A downlink transmission unit that does not need HARQ feedback or a downlink transmission unit whose HARQ feedback information is preset information in downlink transmission units may also be referred to as a non-target transmission unit.

It should be noted that, when the non-target transmission unit in the present disclosure is a downlink transmission unit whose HARQ feedback information is preset information in downlink transmission units, although there is HARQ feedback information in the non-target transmission unit, retransmission is not performed on the non-target transmission unit based on the HARQ feedback information. In other words, no retransmission is performed on the non-target transmission unit.

For example configuration content of downlink transmission units in this operation, similarly refer to the foregoing related descriptions of "(1) Slot configuration". For brevity of the specification, details are not described herein again.

S102: The access network device sends indication information to the terminal.

Correspondingly, the terminal receives the indication information from the access network device. The indication information is used to determine whether HARQ feedback is needed for a transmit block transmitted in a plurality of downlink transmission units.

Specifically, the indication information may explicitly or implicitly indicate, to the terminal, transmit blocks transmitted in downlink transmission units in the plurality of downlink transmission units need HARQ feedback.

Alternatively, the indication information may explicitly or implicitly indicate, to the terminal, transmit blocks transmitted in downlink transmission units in the plurality of downlink transmission units do not need HARQ feedback.

Alternatively, the indication information may explicitly or implicitly indicate, to the terminal, both transmit blocks transmitted in which downlink transmission units in the plurality of downlink transmission units need HARQ feedback and transmit blocks transmitted in which downlink transmission units in the plurality of downlink transmission units do not need HARQ feedback.

In some embodiments, the access network device first sends the indication information to the terminal in a broadcast manner (specific signaling may be in a system message SIB), or in an RRC signaling unicast manner (for example, during connection establishment), or in an RRC signaling multicast manner, or in a MAC signaling unicast manner, or in a MAC signaling multicast manner, or in a DCI manner.

For example content of the indication information, refer to the foregoing related descriptions of "(4) Indication information". For brevity of the specification, details are not described herein again.

S103: The terminal determines HARQ bitmap information based on the indication information. The HARQ bitmap information includes HARQ feedback information of at least one target transmission unit, and does not include HARQ feedback information of a non-target transmission unit. The target transmission unit indicates a downlink transmission unit that needs HARQ feedback in the plurality of downlink transmission units. The non-target transmission unit indicates a downlink transmission unit that does not need HARQ feedback in the plurality of downlink transmission units, or a downlink transmission unit whose HARQ feedback information is preset information in the plurality of downlink transmission units.

In this specification, the HARQ bitmap information may also be referred to as a HARQ feedback codebook or a HARQ codebook. When a type of the HARQ bitmap information is a semi-static scheduling type, the HARQ bitmap information may also be referred to as a HARQ semi-static codebook or a semi-static codebook. The terminal may combine, by using the semi-static codebook, HARQ feedback information of a plurality of pieces of data that need HARQ feedback and that are transmitted by the access network device, to form a codebook for feedback to the access network device. The plurality of pieces of data may come from different downlink transmission units and/or different codewords in MIMO and/or different carriers in carrier aggregation.

For example content of the semi-static codebook, refer to the foregoing related descriptions of "(3) A design of a semi-static codebook for feedback". For brevity of the specification, details are not described herein again.

S104: The terminal sends the HARQ bitmap information to the access network device. Correspondingly, the access network device receives the HARQ bitmap information from the terminal.

It can be learned that in this embodiment of the present disclosure, the access network device properly configures a downlink transmission unit used for data transmission that needs HARQ feedback and a downlink transmission unit used for data transmission that does not need HARQ feedback, and explicitly or implicitly indicates, to the terminal by using specified indication information, whether HARQ feedback is needed for a transmit block transmitted in a plurality of downlink transmission units. The terminal determines, based on the indication information, which downlink transmission units need HARQ feedback and which downlink transmission units do not need HARQ feedback, and generates a semi-static codebook based on HARQ feedback information of the downlink transmission units that need HARQ feedback. To be specific, the semi-static codebook does not include a receiving status of downlink data that does not need HARQ feedback. This can reduce a size of the semi-static codebook for feedback and reduce feedback resource overheads. In addition, because feedback-retransmission processes of some processes or some data of the processes are reduced, data transmission processes of the processes or the data are more compact and fast. This can improve a communication throughput rate and reduce a communication delay.

Figure 18:
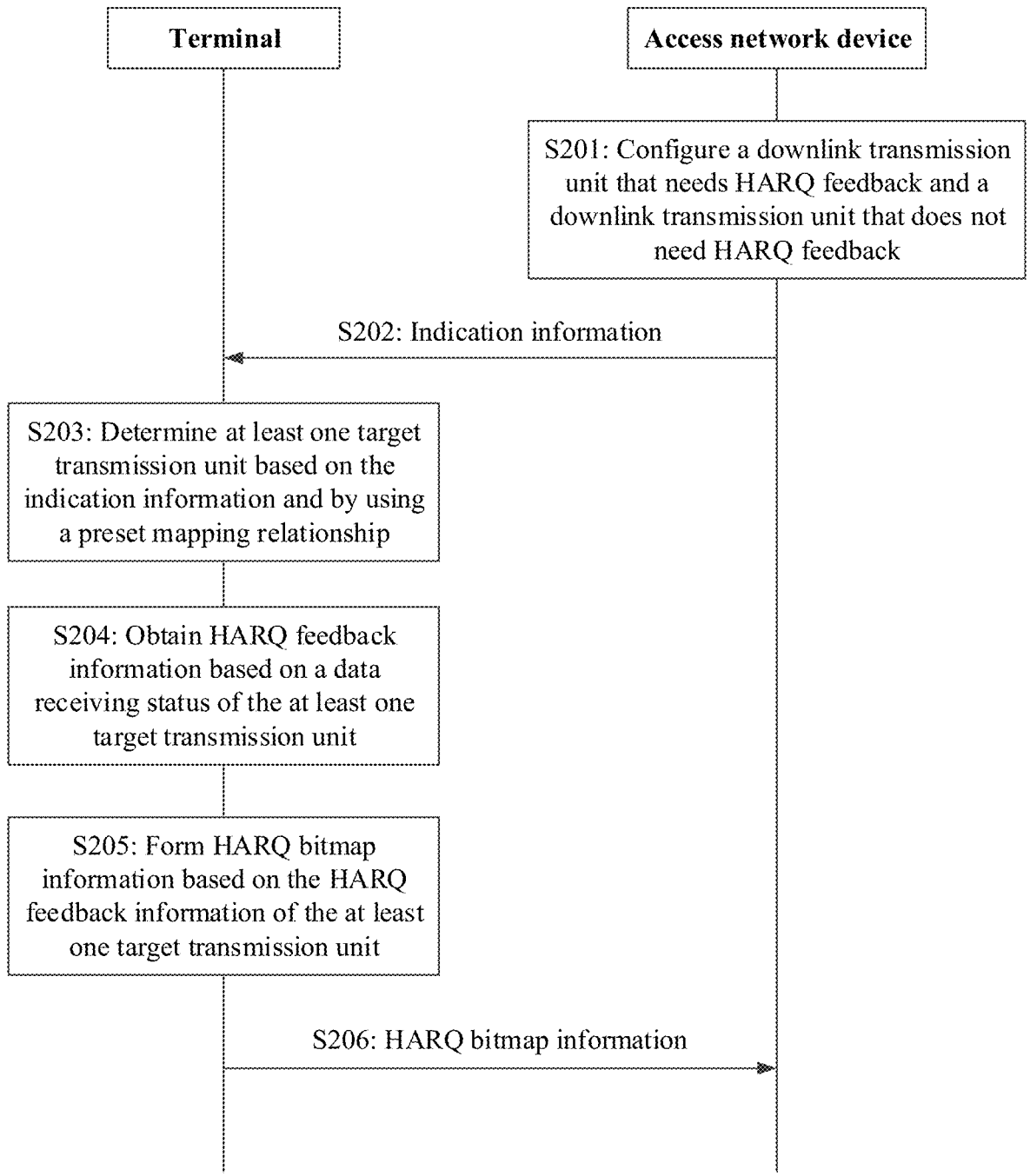
FIG. 18 is another schematic flowchart of codebook feedback according to an embodiment of the present disclosure.

FIG. 18 is a schematic flowchart of a HARQ codebook feedback method according to an embodiment of the present disclosure. The method is described from perspectives of two sides: a terminal and an access network device. The method includes but is not limited to the following operations.

S201: An access network device configures a downlink transmission unit that needs HARQ feedback and a downlink transmission unit that does not need HARQ feedback. For related content, refer to the foregoing descriptions of S101. Details are not described herein again.

S202: The access network device sends indication information to the terminal. Correspondingly, the terminal receives the indication information from the access network device. The indication information is used to determine whether HARQ feedback is needed for a transmit block transmitted in a plurality of downlink transmission units. For related content, refer to the foregoing descriptions of S102. Details are not described herein again.

S203: The terminal determines at least one target transmission unit based on the indication information and by using a preset mapping relationship. The preset mapping relationship includes a mapping relationship between the indication information and the at least one target transmission unit.

There may be a plurality of preset mapping relationships, and each preset mapping relationship reflects an association between specific indication information and a specific indication result (namely, at least one corresponding target transmission unit). The association may be a direct association, or may be an association performed by using an algorithm or a rule.

S204: The terminal obtains HARQ feedback information based on a data receiving status of the at least one target transmission unit.

Because there is a mapping relationship between the indication information and at least one downlink slot, the terminal may determine, after receiving the indication information and based on the mapping relationship, at least one downlink slot that needs HARQ feedback, and generate HARQ feedback information, for example, an ACK or an NACK, corresponding to the at least one downlink slot based on a data receiving status of the at least one downlink slot that needs HARQ feedback.

In addition, for example content of the indication information, refer to the foregoing related descriptions of "(4) Indication information". For brevity of the specification, details are not described herein again.

S205: The terminal forms HARQ bitmap information based on the HARQ feedback information of the at least one target transmission unit. The HARQ bitmap information includes the HARQ feedback information of the at least one target transmission unit, and does not include HARQ feedback information of a non-target transmission unit. The target transmission unit indicates a downlink transmission unit that needs HARQ feedback in the plurality of downlink transmission units. The non-target transmission unit indicates a downlink transmission unit that does not need HARQ feedback in the plurality of downlink transmission units, or a downlink transmission unit whose HARQ feedback information is preset information in the plurality of downlink transmission units. The preset information is one or more of an acknowledgement ACK, a negative acknowledgement NACK, and a decoding result.

Similarly, the HARQ bitmap information may also be referred to as a HARQ feedback codebook or a HARQ codebook. When a type of the HARQ bitmap information is a semi-static scheduling type, the HARQ bitmap information may also be referred to as a HARQ semi-static codebook or a semi-static codebook. The terminal may combine, by using the semi-static codebook, HARQ feedback information of a plurality of pieces of data that need HARQ feedback and that are transmitted by the access network device, to form a codebook for feedback to the access network device. The plurality of pieces of data may come from different downlink transmission units and/or different codewords in MIMO and/or different carriers in carrier aggregation.

For example content of the semi-static codebook, refer to the foregoing related descriptions of "(3) A design of a semi-static codebook for feedback". For brevity of the specification, details are not described herein again.

S206: The terminal sends the HARQ bitmap information to the access network device. Correspondingly, the access network device receives the HARQ bitmap information from the terminal. It can be learned that in this embodiment of the present disclosure, the access network device properly configures a downlink transmission unit used for data transmission that needs HARQ feedback and a downlink transmission unit used for data transmission that does not need HARQ feedback, and explicitly or implicitly indicates, to the terminal by using specified indication information, whether HARQ feedback is needed for a transmit block transmitted in a plurality of downlink transmission units. The terminal determines, based on the indication information and by using a preset mapping relationship, which downlink transmission units need HARQ feedback and which downlink transmission units do not need HARQ feedback, and generates a semi-static codebook based on HARQ feedback information of the downlink transmission units that need HARQ feedback. To be specific, the semi-static codebook does not include a receiving status of downlink data that does not need HARQ feedback. This can reduce a size of the semi-static codebook for feedback and reduce feedback resource overheads. In addition, because feedback-retransmission processes of some processes or some data of the processes are reduced, data transmission processes of the processes or the data are more compact and fast. This can improve a communication throughput rate and reduce a communication delay.

Figure 19A:
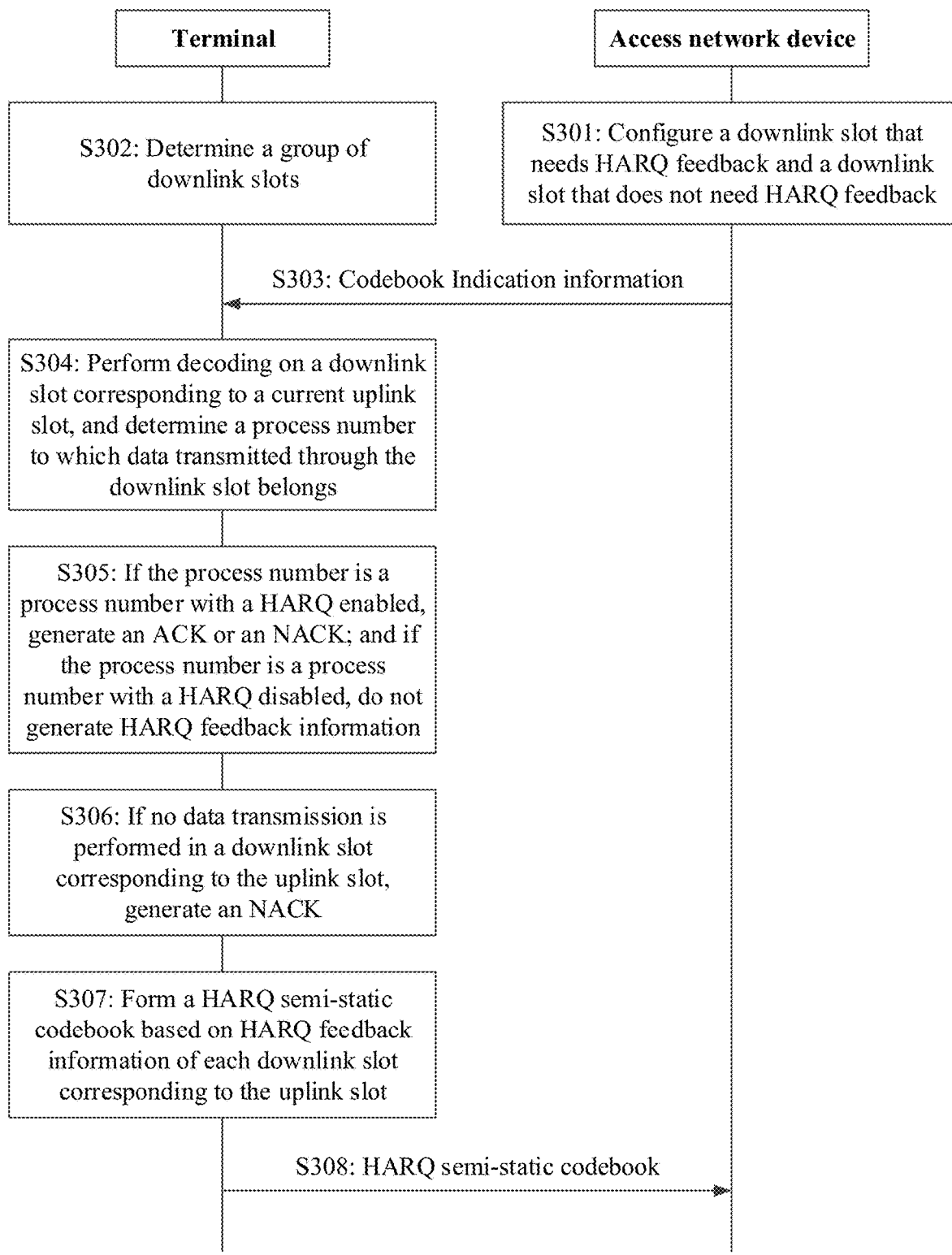
FIG. 19A is still another schematic flowchart of codebook feedback according to an embodiment of the present disclosure.

FIG. 19A is a schematic flowchart of another HARQ codebook feedback method according to an embodiment of the present disclosure. The method is described from perspectives of two sides: a terminal and an access network device. In this embodiment, the method is described by using an example in which the indication information is process indication information. The method includes but is not limited to the following operations.

S301: An access network device configures a downlink slot that needs HARQ feedback and a downlink slot that does not need HARQ feedback. For related content, refer to the foregoing description of S101. Details are not described herein again.

S302: A terminal determines a group of candidate downlink slots. To be specific, the terminal determines a plurality of downlink slots available for data transmission corresponding to an uplink slot.

For example, the access network device may send RRC signaling for determining a downlink transmission slot to the terminal. The RRC signaling carries a related parameter, and the terminal determines a group of candidate downlink slots according to the related parameter. In this way, for a transmission occasion of each uplink slot, the terminal may know which downlink slots corresponding to the uplink slot need decoding. For example, in any one of embodiments shown in FIG. 4 to FIG. 7, it is determined that the uplink slot whose slot number is 9 corresponds to eight candidate downlink slots whose slot numbers are 0, 1, 2, 3, 4, 6, 7 and 8.

It should be noted that S301 may be performed before S302, or may be performed after S302, or S301 and S302 may be simultaneously performed. This is not limited in the present disclosure.

S303: The access network device sends process indication information to the terminal. Correspondingly, the terminal receives the process indication information from the access network device.

In a possible embodiment, there is a mapping relationship between the process indication information and a process that needs HARQ feedback, and there is a mapping relationship between the process that needs HARQ feedback and the at least one target transmission unit. Specifically, the process indication information may directly or indirectly indicate a process that needs HARQ feedback and a process that does not need HARQ feedback. Each process may correspond to one or more downlink transmission units. Therefore, whether HARQ feedback is needed for a transmit block transmitted in a plurality of downlink transmission units may be further determined based on the process indication information.

For example content of the process indication information, refer to the foregoing related description of the process indication information of "(4) Indication information". For brevity of the specification, details are not described herein again.

S304: The terminal performs decoding on a plurality of downlink slots of the uplink slot, and determines a process number to which data transmitted through the downlink slots belongs.

S305: If the process number is corresponding to an enabled HARQ process, generate HARQ feedback information (an ACK or an NACK); and if the process number is a process number corresponding to a disabled HARQ process, do not generate HARQ feedback information.

S306: If no data transmission is performed in a downlink slot corresponding to the uplink slot, generate HARQ feedback information (a NACK).

S307: The terminal forms a HARQ semi-static codebook based on HARQ feedback information of each downlink slot corresponding to the uplink slot.

Specifically, after obtaining data transmitted in a plurality of candidate downlink transmission slots, the terminal may first decode the data transmitted in the downlink transmission slots. If it is found that a HARQ process number indicated by control information (for example, DCI) in the data corresponds to a disabled HARQ process, neither an ACK nor an NACK is generated after decoding. If it is found that the HARQ process number indicated by the control information (for example, DCI) in the data corresponds to a not disabled HARQ process, an ACK or an NACK is accordingly generated based on whether decoding is correct. For the not disabled HARQ process, if no data transmission is performed in a slot, an NACK may be fed back accordingly. To be specific, after decoding, the terminal determines a size of a codebook, and knows which slot or data needs HARQ feedback and which slot or data does not need HARQ feedback, to generate a corresponding semi-static codebook. The semi-static codebook includes only HARQ information of data that needs HARQ feedback, and does not include HARQ information of data that does not need HARQ feedback.

S308: The terminal sends the HARQ semi-static codebook to the access network device. Correspondingly, the access network device receives the HARQ semi-static codebook from the terminal.

Figure 22:
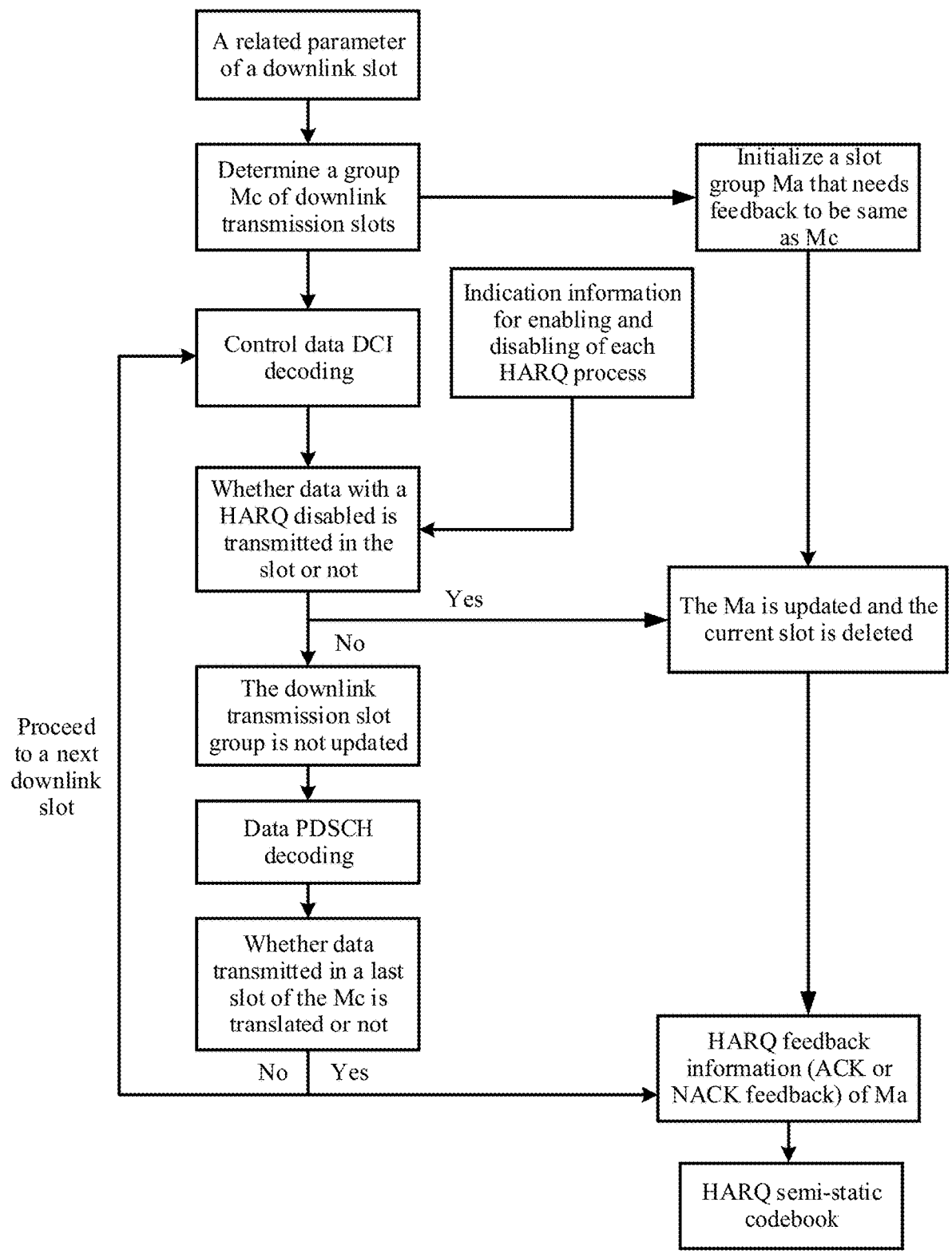
FIG. 22 is another schematic flowchart of generating a semi-static codebook according to an embodiment of the present disclosure.

For better understanding of solutions of the present disclosure, refer to FIG. 22. FIG. 22 is an example of a procedure in which a terminal generates a semi-static codebook based on process indication information. As shown in FIG. 22, on one hand, the terminal may obtain a downlink transmission slot set Mc of downlink slots in advance based on a related parameter in RRC signaling, and therefore, during initialization, the downlink transmission slot set Ma that needs HARQ feedback is consistent with Mc by default. On the other hand, the terminal may obtain the process indication information from the access network device, to determine an enabled HARQ process and a disabled HARQ process. The terminal sequentially performs DCI decoding on each slot in Mc, and checks control information (DCI) of data transmitted in a slot. If it is found that a HARQ process number indicated by the control information corresponds to a disabled HARQ process, Ma is updated, that is, the slot is removed from Ma. If it is found that the HARQ process number indicated by the control information corresponds to a not disabled HARQ process, Ma is not updated in this case, and data PDSCH decoding continues to be performed. Then, a decoding process of a next slot is performed until all slots in Mc are decoded. In this process, Ma is updated operation by operation. When decoding of all slots is completed, the finally updated Ma includes only a downlink transmission slot that needs HARQ feedback, and does not include a downlink transmission slot that does not need HARQ feedback. In this way, the terminal may separately generate corresponding HARQ feedback information based on data decoding statuses of all slots in Ma, and combine the HARQ feedback information to form a HARQ semi-static codebook.

It can be learned that in this embodiment of the present disclosure, the access network device properly configures a downlink transmission unit used for data transmission that needs HARQ feedback and a downlink transmission unit used for data transmission that does not need HARQ feedback, and explicitly or implicitly indicates, to the terminal by using process indication information, whether HARQ feedback is needed for a transmit block transmitted in a plurality of downlink transmission units. The terminal generates a semi-static codebook based on HARQ feedback information of the downlink transmission unit that needs HARQ feedback. To be specific, the semi-static codebook does not include a receiving status of downlink data that does not need HARQ feedback. This can reduce a size of the semi-static codebook for feedback and reduce feedback resource overheads. In addition, because feedback-retransmission processes of some processes or some data of the processes are reduced, data transmission processes of the processes or the data are more compact and fast. This can improve a communication throughput rate and reduce a communication delay.

Figure 19B:
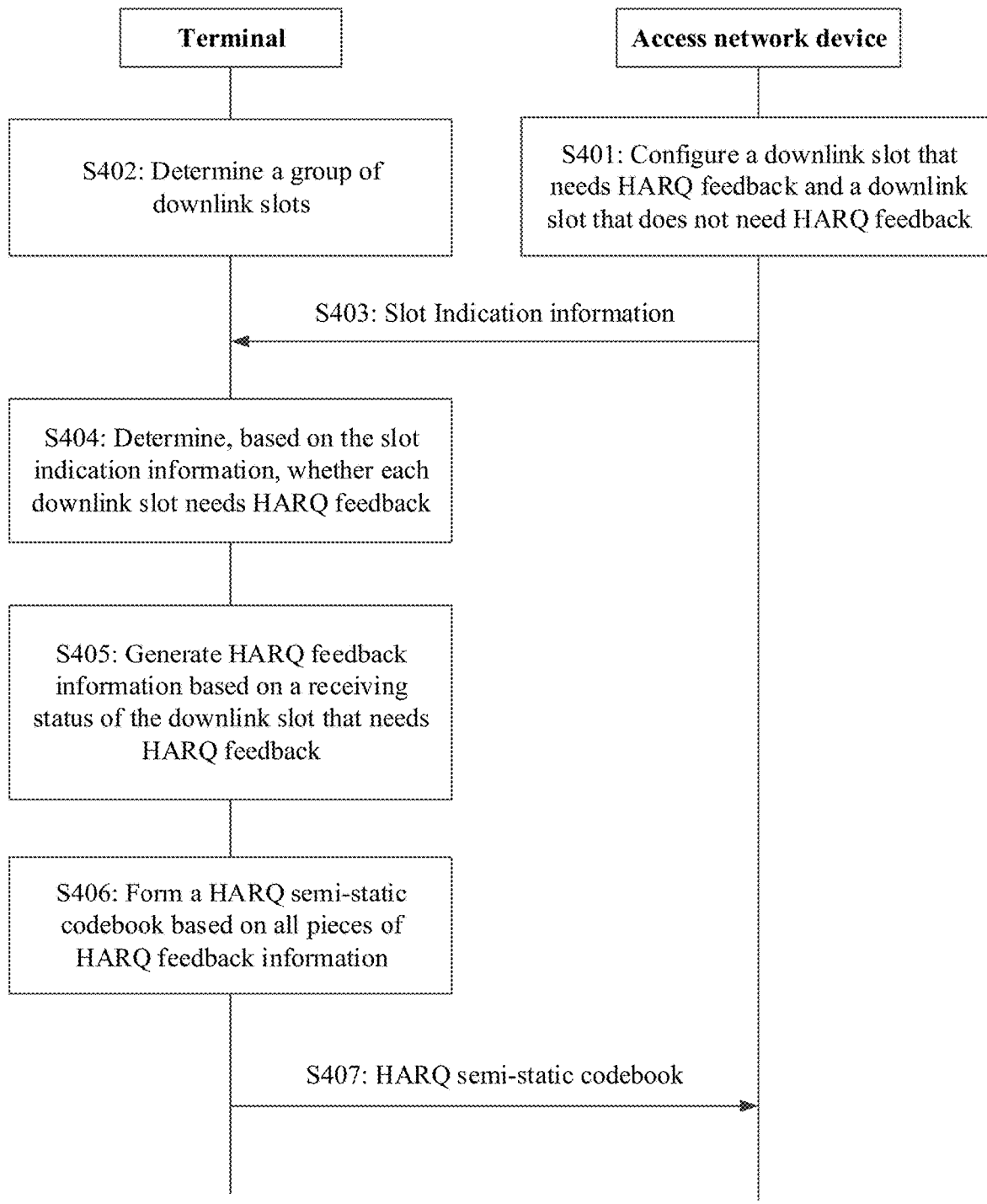
FIG. 19B is yet another schematic flowchart of codebook feedback according to an embodiment of the present disclosure.

FIG. 19B is a schematic flowchart of another HARQ codebook feedback method according to an embodiment of the present disclosure. The method is described from perspectives of two sides: a terminal and an access network device. In this embodiment, the method is described by using an example in which the indication information is slot indication information. The method includes but is not limited to the following operations.

S401: An access network device configures a downlink slot that needs HARQ feedback and a downlink slot that does not need HARQ feedback. For related content, refer to the foregoing description of S101. Details are not described herein again.

S402: A terminal determines a group of candidate downlink slots. To be specific, the terminal determines a plurality of downlink slots available for data transmission corresponding to an uplink slot. For related content, refer to the foregoing description of S302. Details are not described herein again.

S403: The access network device sends transmission unit indication information to the terminal. Correspondingly, the terminal receives the transmission unit indication information from the access network device. The transmission unit indication information is used to determine whether HARQ feedback is needed for a transmit block transmitted in a plurality of downlink transmission units. In an embodiment, the transmission unit indication information may be slot indication information. The slot indication information directly or indirectly indicate a slot that needs HARQ feedback and/or a slot that does not need HARQ feedback in the plurality of downlink slots.

For example content of the transmission unit indication information, similarly refer to the foregoing related description of the slot indication information of "(4) Indication information". For brevity of the specification, details are not described herein again.

S404: The terminal determines, based on the slot indication information, whether each downlink slot needs HARQ feedback.

S405: The terminal generates corresponding HARQ feedback information based on a data receiving status of the downlink slot that needs HARQ feedback.

S406: The terminal forms a HARQ semi-static codebook based on HARQ feedback information of all downlink slots that need HARQ feedback.

Specifically, when the transmission unit indication information indicates a downlink slot that does not need HARQ feedback, after obtaining a plurality of candidate downlink slots, the terminal determines a downlink slot other than a downlink slot that does not need HARQ feedback in these downlink transmission slots as a downlink slot that needs HARQ feedback, decodes data transmitted in the downlink slot that needs HARQ feedback, generates an ACK or an NACK based on whether decoding is correct, and does not perform feedback for data transmitted in a downlink slot that does not need HARQ feedback. If no data transmission is performed in some downlink slots that need HARQ feedback, an NACK is also fed back. The terminal combines HARQ feedback information of all downlink slots that need HARQ feedback, to form a HARQ semi-static codebook.

S407: The terminal sends the HARQ semi-static codebook to the access network device. Correspondingly, the access network device receives the HARQ semi-static codebook from the terminal.

Figure 23:
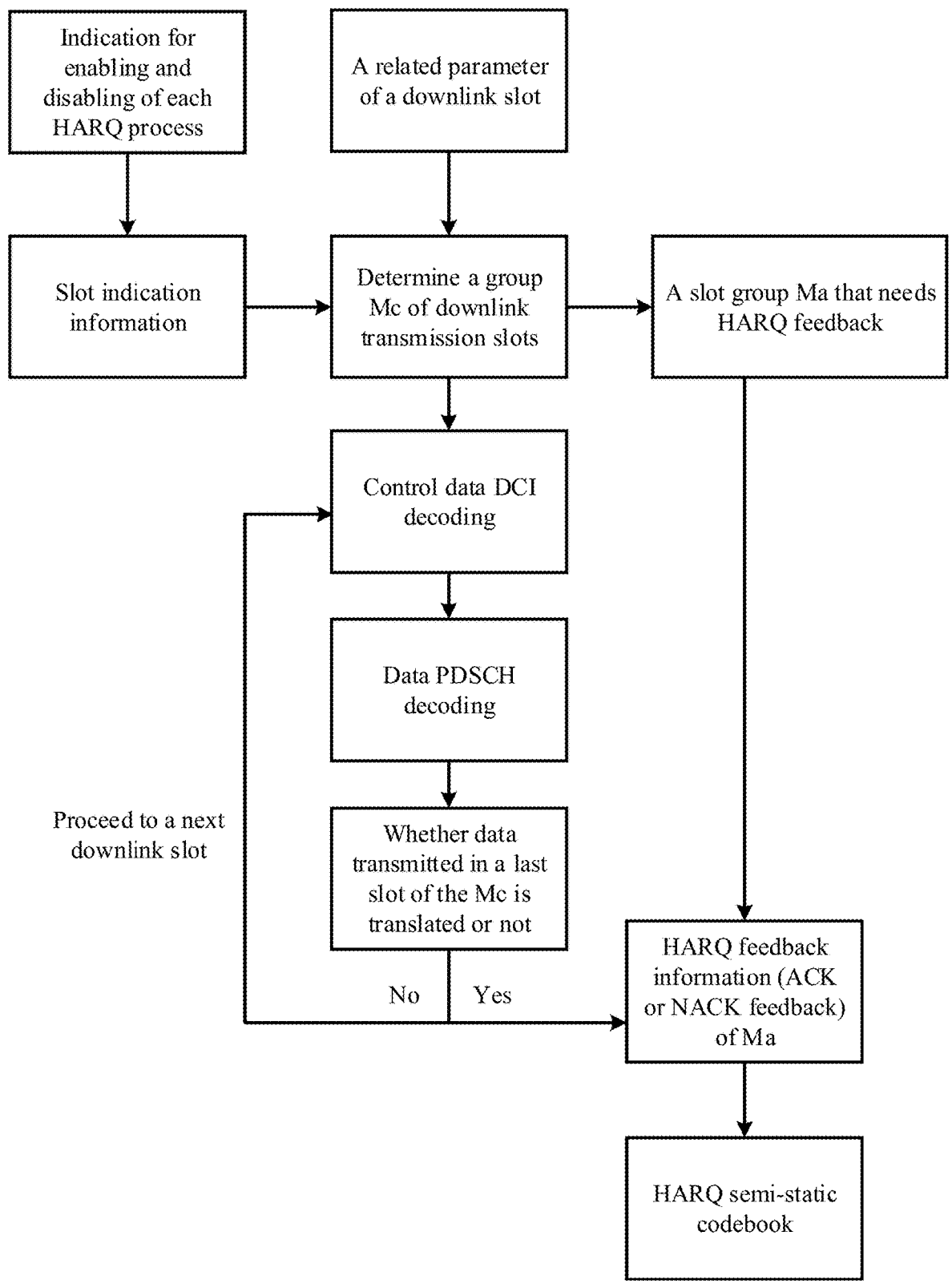
FIG. 23 is still another schematic flowchart of generating a semi-static codebook according to an embodiment of the present disclosure.

For better understanding of solutions of the present disclosure, refer to FIG. 23. FIG. 23 is an example of a procedure in which a terminal generates a semi-static codebook based on slot indication information. As shown in FIG. 23, on one hand, the terminal may obtain a downlink transmission slot set Mc of downlink slots in advance based on a related parameter in RRC signaling. On the other hand, the access network device may generate slot indication information based on an enabled HARQ process and a disabled HARQ process. After obtaining the slot indication information from the access network device, the terminal may directly determine, based on the slot indication information, a slot that needs HARQ feedback and/or a slot that does not need HARQ feedback. The terminal generates, based on all slots that need HARQ feedback, a slot set Ma that needs feedback. It may be understood that Ma does not need to be updated. The terminal sequentially performs DCI decoding and data PDSCH decoding on each slot in Mc. Then, a decoding process of a next slot is performed until all slots in Mc are decoded. When decoding of all slots is completed, the terminal may separately generate corresponding HARQ feedback information based on data decoding statuses of all slots in Ma, and combine the HARQ feedback information to form a HARQ semi-static codebook.

It can be learned that in this embodiment of the present disclosure, the access network device properly configures a downlink slot used for data transmission that needs HARQ feedback and a downlink slot used for data transmission that does not need HARQ feedback, and indicates, to the terminal by using slot indication information, whether HARQ feedback is needed for a transmit block transmitted in a plurality of downlink slots. The terminal generates a semi-static codebook based on HARQ feedback information of the downlink slot that needs HARQ feedback. To be specific, the semi-static codebook does not include a receiving status of downlink data that does not need HARQ feedback. This can reduce a size of the semi-static codebook for feedback and reduce feedback resource overheads. In addition, because feedback-retransmission processes of some processes or some data of the processes are reduced, data transmission processes of the processes or the data are more compact and fast. This can improve a communication throughput rate and reduce a communication delay.

Figure 19C:
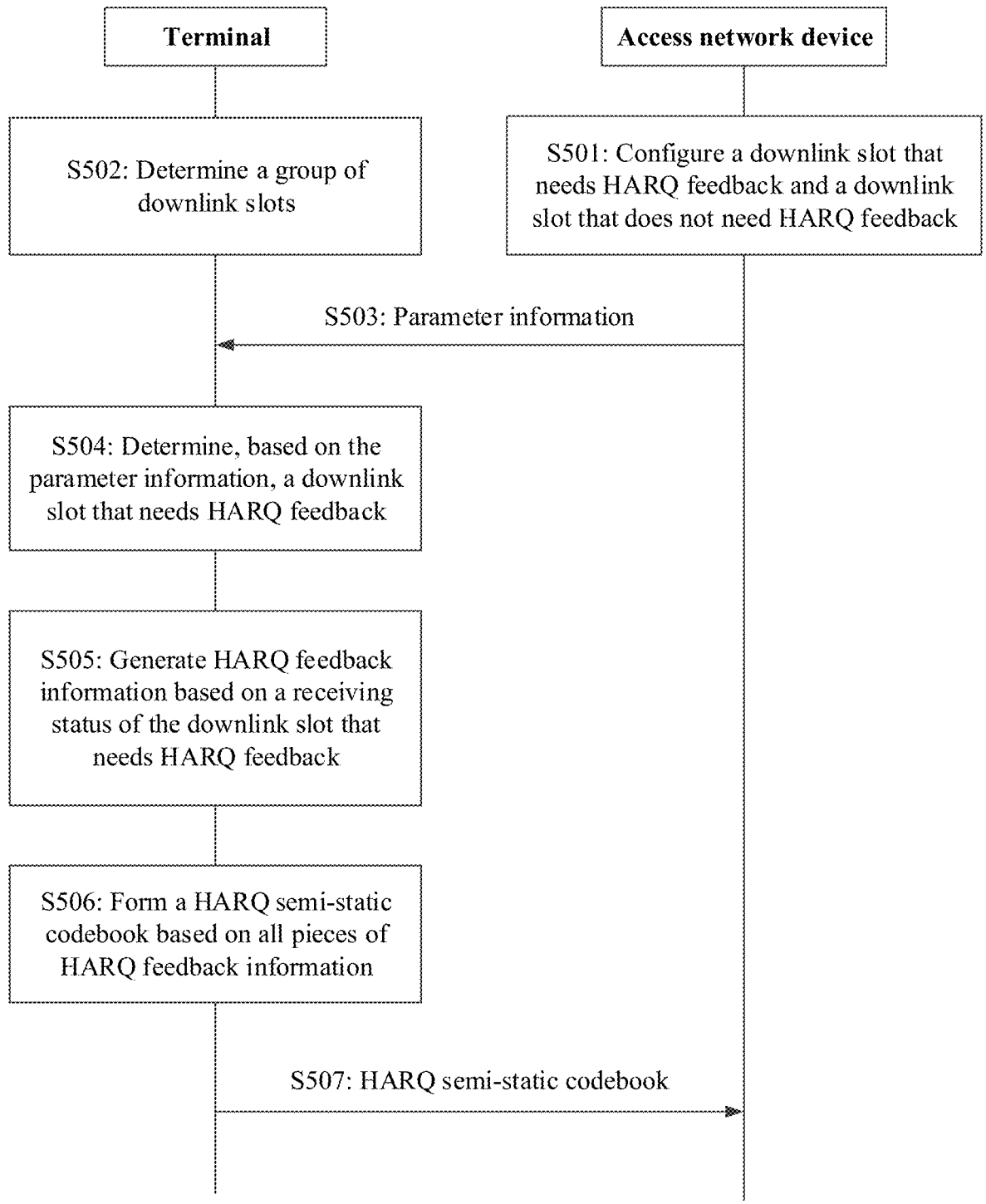
FIG. 19C is still yet another schematic flowchart of codebook feedback according to an embodiment of the present disclosure.

FIG. 19C is a schematic flowchart of still another HARQ codebook feedback method according to an embodiment of the present disclosure. The method is described from perspectives of two sides: a terminal and an access network device. In this embodiment, the method is described by using an example in which the indication information is parameter information. The method includes but is not limited to the following operations.

S501: An access network device configures a downlink slot that needs HARQ feedback and a downlink slot that does not need HARQ feedback. For related content, refer to the foregoing description of S101. Details are not described herein again.

S502: A terminal determines a group of candidate downlink slots. To be specific, the terminal determines a plurality of downlink slots available for data transmission corresponding to an uplink slot. For related content, refer to the foregoing description of S302. Details are not described herein again.

S503: The access network device sends parameter information to the terminal. Correspondingly, the terminal receives the parameter information from the access network device. The parameter information is used to determine the at least one target transmission unit by using a preset algorithm.

For example content of the parameter information, similarly refer to the foregoing related description of the parameter information of "(4) Indication information". For brevity of the specification, details are not described herein again.

S504: The terminal determines, based on the parameter information, whether each downlink slot needs HARQ feedback.

S505: The terminal generates corresponding HARQ feedback information based on a data receiving status of a downlink slot that needs HARQ feedback.

S506: The terminal forms a HARQ semi-static codebook based on HARQ feedback information of all downlink slots that need HARQ feedback.

Specifically, the terminal decodes data transmitted by a downlink slot that needs HARQ feedback, generates an ACK or an NACK based on whether decoding is correct, and does not perform feedback for data transmitted in a downlink slot that does not need HARQ feedback. If no data transmission is performed in some downlink slots that need HARQ feedback, an NACK is also fed back. The terminal combines HARQ feedback information of all downlink slots that need HARQ feedback, to form a HARQ semi-static codebook.

S507: The terminal sends the HARQ semi-static codebook to the access network device. Correspondingly, the access network device receives the HARQ semi-static codebook from the terminal.

It can be learned that in this embodiment of the present disclosure, the access network device properly configures a downlink slot used for data transmission that needs HARQ feedback and a downlink slot used for data transmission that does not need HARQ feedback, and sends the parameter information to the terminal. The terminal may determine, based on the parameter information and by using the preset algorithm, whether HARQ feedback is needed for a transmit block transmitted in a plurality of downlink slots. The terminal generates a semi-static codebook based on HARQ feedback information of the downlink slot that needs HARQ feedback. To be specific, the semi-static codebook does not include a receiving status of downlink data that does not need HARQ feedback. This can reduce a size of the semi-static codebook for feedback and reduce feedback resource overheads. In addition, because feedback-retransmission processes of some processes or some data of the processes are reduced, data transmission processes of the processes or the data are more compact and fast. This can improve a communication throughput rate and reduce a communication delay.

In another possible embodiment of the present disclosure, in addition to the indication information, the information sent by the access network device to the terminal further includes bundling information. The bundling information indicates to perform an AND logical operation on the HARQ feedback information of the at least one target transmission unit and the HARQ feedback information of the at least one non-target transmission unit, to obtain the HARQ semi-static codebook.

For example, in a configuration, it is assumed that a parameter "harq-ACK-SpatialBundlingPUCCH" or a parameter "harq-ACK-SpatialBundlingPUSCH" is indicated as enabled. In this case, it is assumed that a user receives two TBs, and the terminal performs an AND operation on decoding results ACK (1)/NACK (0) of the two TBs to form one bit for feedback. If decoding of either TB is incorrect, it means that the two TBs need retransmission. It is assumed that a decoding result of only one TB is received, feedback for the second TB is considered as an ACK by default. The parameter harq-ACK-Spatial-BundlingPUCCH indicates that feedback of a semi-static codebook is performed through a control channel, and the parameter harq-ACK-SpatialBundlingPUSCH indicates that feedback of a semi-static codebook is performed through a data channel.

Figure 20:
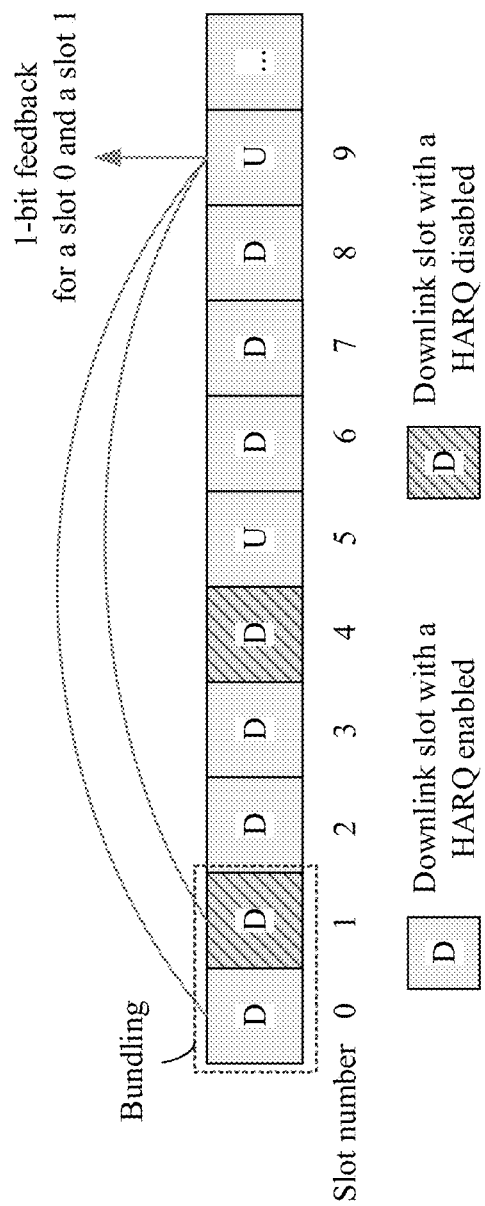
FIG. 20 is a diagram of an example of still yet another slot configuration scenario according to an embodiment of the present disclosure.

When slot configuration is completed, one of the two TBs or one of slots in which the two TBs are located may need HARQ feedback, and the other one does not need HARQ feedback. In this case, a status of the harq-ACK-Spatial-BundlingPUCCH or the harq-ACK-SpatialBundlingPUSCH may be extended from two states, including an enabled state and a disabled state, to three states, including an enabled state, a disabled state, and an enabled/disabled state of HARQ feedback. As shown in FIG. 20, it is assumed that HARQ feedback is needed for data transmitted in the slot whose slot number is 0, and HARQ feedback is not needed for data transmitted in the slot whose slot number is 1. When HARQ feedback is enabled/disabled, the slots whose slot numbers are 0 and 1 are bundled. To be specific, decoding results of TBs transmitted in the two slots are bundled into one bit for feedback, and an ACK or an NACK is fed back accordingly for the data transmitted in the slot whose slot number is 0 based on whether decoding is correct. By default, an ACK always needs to be fed back for the data transmitted in the slot whose slot number is 1. In this way, after the AND operation is performed, HARQ feedback information finally bundled for feedback is equivalent to a feedback result of the first TB, and HARQ feedback information of the second TB is equivalent to being discarded. If the HARQ feedback information bundled for feedback is an ACK, retransmission is not needed. If the HARQ feedback information bundled for feedback is an NACK, retransmission is performed for only the first TB. It can be learned that in this configuration, no feedback resource is added.

Figure 21:
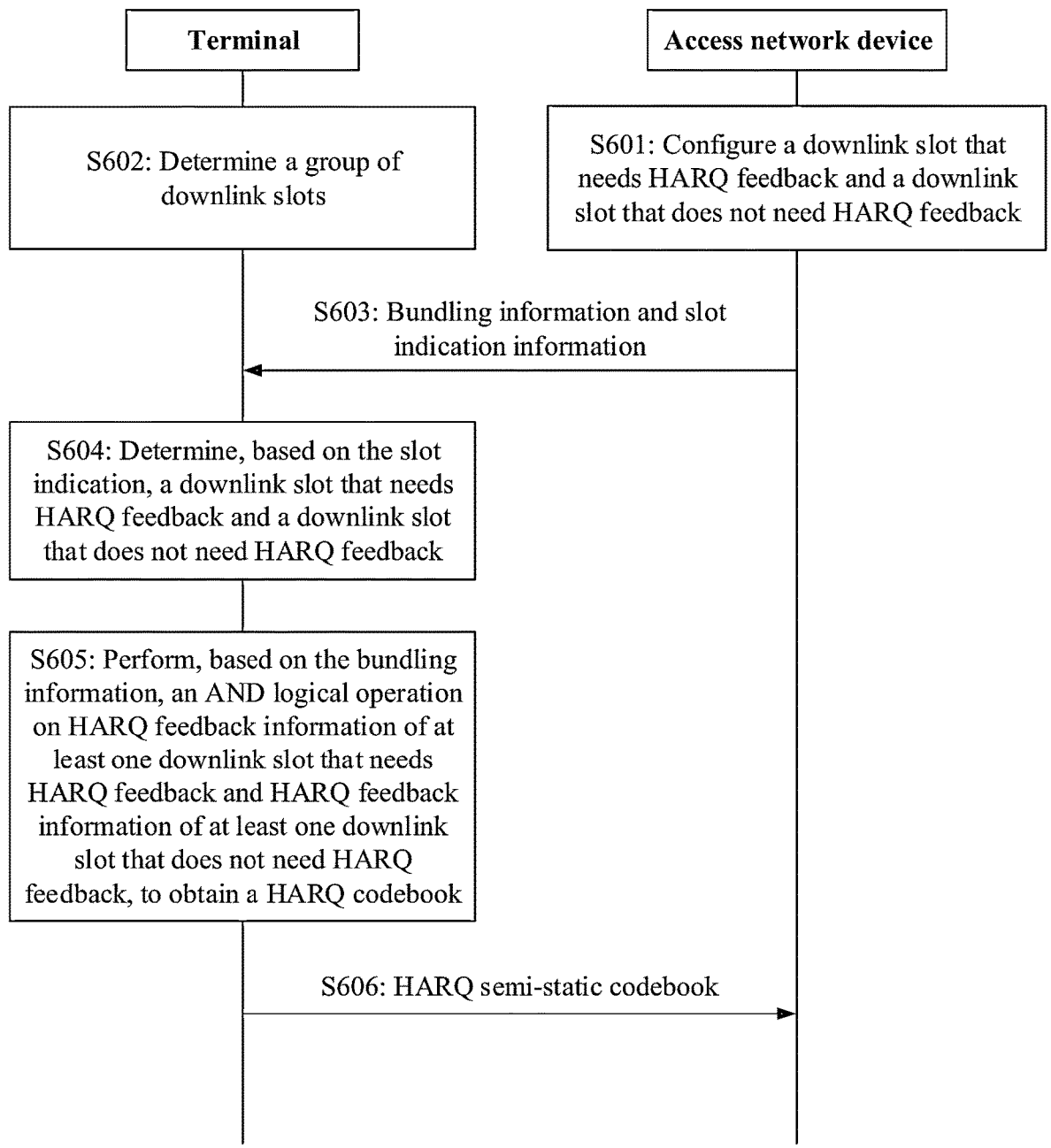
FIG. 21 is still a further schematic flowchart of codebook feedback according to an embodiment of the present disclosure.

FIG. 21 is a schematic flowchart of yet another HARQ codebook feedback method according to an embodiment of the present disclosure. The method is described from perspectives of two sides: a terminal and an access network device. In this embodiment, the method is described by using an example of the indication information and the bundling information. The method includes but is not limited to the following operations.

S601: An access network device configures a downlink transmission unit that needs HARQ feedback and a downlink transmission unit that does not need HARQ feedback. For related content, refer to the foregoing description of S101. Details are not described herein again.

S602: A terminal determines a group of candidate downlink slots. To be specific, the terminal determines a plurality of downlink slots available for data transmission corresponding to an uplink slot. For related content, refer to the foregoing description of S302. Details are not described herein again.

S603: The access network device sends indication information and bundling information to the terminal. Correspondingly, the terminal receives the indication information from the access network device. The indication information is used to determine whether HARQ feedback needs to be performed for transmit blocks transmitted in a plurality of downlink transmission units. The bundling information indicates to perform an AND logical operation on HARQ feedback information of at least one target transmission unit and HARQ feedback information of at least one non-target transmission unit.

S604: The terminal determines, based on the slot indication, a downlink slot that needs HARQ feedback and a downlink slot that does not need HARQ feedback.

S605: The terminal performs, based on the bundling information, the AND logical operation on HARQ feedback information of at least one downlink slot that needs HARQ feedback and HARQ feedback information of at least one downlink slot that does not need HARQ feedback, to obtain a HARQ codebook.

For example implementation content, similarly refer to related description of the embodiment in FIG. 20. Details are not described herein again.

S606: The terminal sends the HARQ semi-static codebook to the access network device. Correspondingly, the access network device receives the HARQ semi-static codebook from the terminal.

It can be learned that in this embodiment of the present disclosure, the access network device properly configures a downlink slot used for data transmission that needs HARQ feedback and a downlink slot used for data transmission that does not need HARQ feedback, and sends the indication information and the bundling information to the terminal. The terminal may determine, based on the indicator information and by using the preset algorithm, whether HARQ feedback is needed for a transmit block transmitted in a plurality of downlink slots, and perform, based on the bundling information, the AND logical operation on the HARQ feedback information of the at least one downlink slot that needs HARQ feedback and the HARQ feedback information of the at least one downlink slot that does not need HARQ feedback, to obtain a HARQ codebook. The semi-static codebook is equivalently considered not to include a receiving status of downlink data that does not need HARQ feedback. This can reduce a size of the semi-static codebook for feedback, reduce feedback resource overheads, improve a communication throughput rate, and reduce a communication delay.

Based on a same inventive concept, the following provides a related device in an embodiment of the present disclosure.

Figure 24:
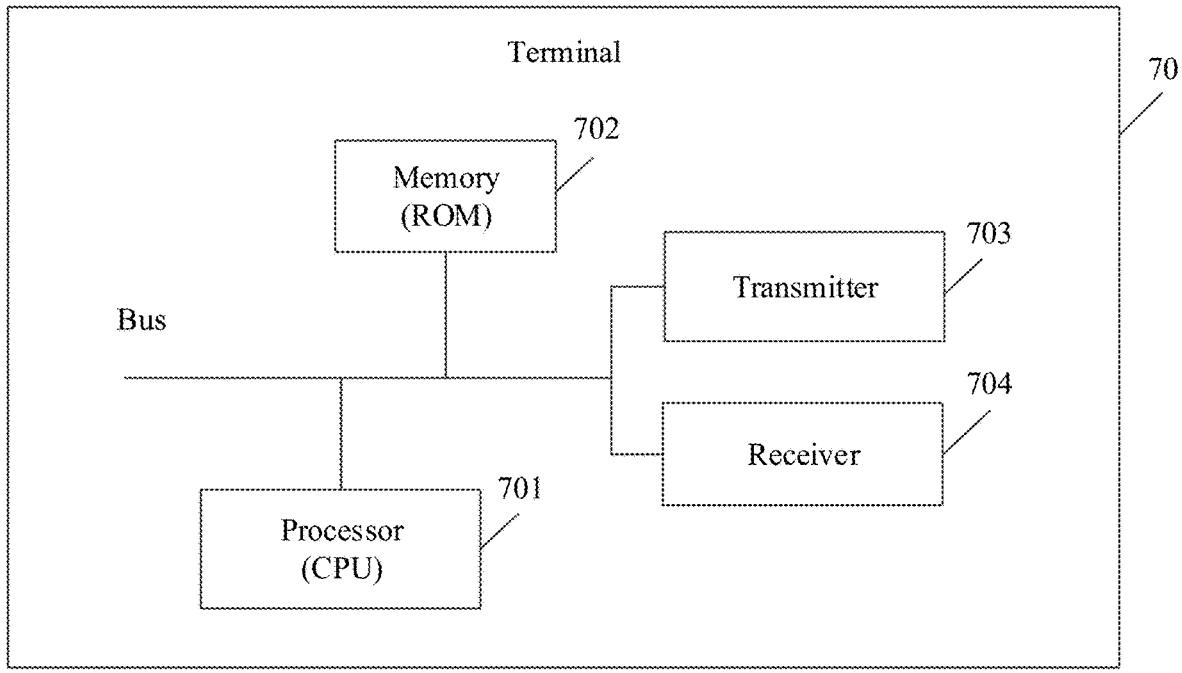
FIG. 24 is a schematic diagram of a structure of a terminal according to an embodiment of the present disclosure.

FIG. 24 is a schematic diagram of a terminal 70 according to an embodiment of the present disclosure. The terminal 70 includes at least a processor 701, a memory 702, a transmitter 703, and a receiver 704. The processor 701, the memory 702, the transmitter 703, and the receiver 704 may be coupled by using a bus.

The transmitter 703 is configured to send data, for example, a semi-static codebook, to an access network device. The receiver 704 is configured to receive data, for example, indication information, bundling information, various types of signaling, and various types of downlink data, from the access network device.

The processor 701 may invoke program code and data in the memory 702. In an actual application, the processor 701 may include one or more general-purpose processors. The general-purpose processor may be any type of device that can process electronic instructions, and include a central processing unit (CPU), a microprocessor, a microcontroller, a main processor, a controller, an application-specific integrated circuit (ASIC), or the like. The processor 701 reads program code stored in the memory 702, and cooperates with the memory 702 and the transmitter 703 to perform some or all operations of the method performed by the terminal in the foregoing embodiments of this specification.

The memory 702 may store program code and data. In an actual application, the memory 702 may include a volatile memory, for example, a random access memory (RAM). The memory may further include a non-volatile memory, for example, a read-only memory (ROM), a flash memory, a hard disk drive (HDD), or a solid-state drive (SSD). Alternatively, the memory may include a combination of the foregoing types of memories.

Specifically, the receiver 704 may be configured to receive indication information from the access network device. The indication information is used to determine whether HARQ feedback is needed for a transmit block transmitted in a plurality of downlink transmission units.

The processor 701 may be configured to determine HARQ bitmap information based on the indication information. The HARQ bitmap information includes HARQ feedback information of at least one target transmission unit, and does not include HARQ feedback information of a non-target transmission unit. The target transmission unit indicates a downlink transmission unit that needs HARQ feedback in the plurality of downlink transmission units. The non-target transmission unit indicates a downlink transmission unit that does not need HARQ feedback in the plurality of downlink transmission units, or a downlink transmission unit whose HARQ feedback information is preset information in the plurality of downlink transmission units. The preset information is one or more of an acknowledgement ACK, a negative acknowledgement NACK, and a decoding result.

The transmitter 703 may be configured to send the HARQ bitmap information to the access network device.

For example functions of elements of the terminal 70, refer to related descriptions of the terminal in FIG. 17 to FIG. 23. For brevity of the specification, details are not described herein again.

Accordingly, an embodiment of the present disclosure further provides a chip. The chip may be used in, for example, a terminal. The chip includes an input interface, an output interface, and a logic circuit. The output interface is configured to send data to an access network device, the input interface is configured to receive data from the access network device, and the logic circuit is configured to control the chip to perform functions. For examples of the performed functions, refer to related descriptions of the terminal in FIG. 17 to FIG. 23. For brevity of the specification, details are not described herein again.

Figure 25:
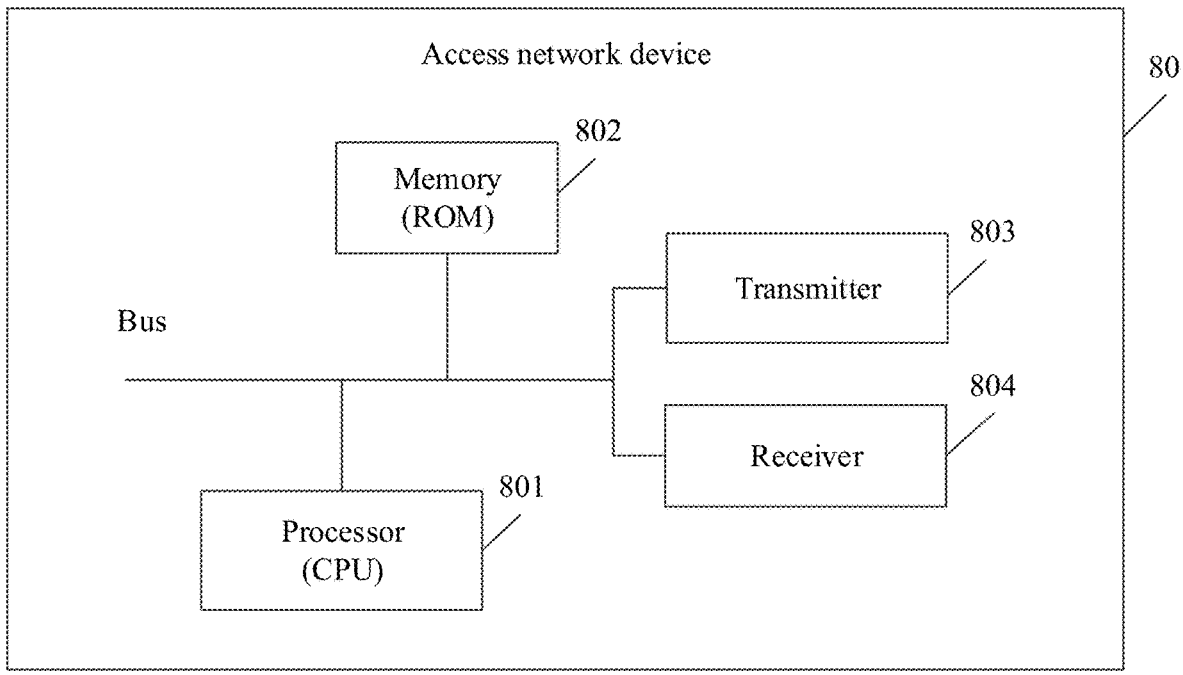
FIG. 25 is a schematic diagram of a structure of an access network device according to an embodiment of the present disclosure.

FIG. 25 is a schematic diagram of an access network device 80 according to an embodiment of the present disclosure. The access network device 80 includes at least a processor 801, a memory 802, a transmitter 803, and a receiver 804. The processor 801, the memory 802, the transmitter 803, and the receiver 804 may be coupled by using a bus. In some embodiments, the access network device 80 may be a satellite base station.

The transmitter 803 is configured to send data, for example, indication information, bundling information, various types of signaling, and various types of downlink data, to a terminal. The receiver 804 is configured to receive data, for example, a semi-static codebook that receives feedback, from the terminal.

The processor 801 may invoke program code and data in the memory 802. In an actual application, the processor 801 may include one or more general-purpose processors. The general-purpose processor may be any type of device that can process electronic instructions, and include a central processing unit (CPU), a microprocessor, a microcontroller, a main processor, a controller, an application-specific integrated circuit (ASIC), or the like. The processor 801 reads program code stored in the memory 802, and cooperates with the memory 802 and the transmitter 803 to perform some or all operations of the method performed by the access network device in the foregoing embodiments of this specification.

The memory 802 may store program code and data. In an actual application, the memory 802 may include a volatile memory, for example, a random access memory (RAM). The memory may further include a non-volatile memory, for example, a read-only memory (ROM), a flash memory, a hard disk drive (HDD), or a solid-state drive (SSD). Alternatively, the memory may include a combination of the foregoing types of memories.

Specifically, the processor 801 may be configured to configure a slot that needs/does not need HARQ feedback, determine an enabled HARQ process or a disabled HARQ process, and the like.

The transmitter 803 may be configured to send the indication information to the terminal. The indication information is used to determine whether HARQ feedback is needed for a transmit block transmitted in a plurality of downlink transmission units.

The receiver 804 may be configured to receive HARQ bitmap information from the terminal. The HARQ bitmap information includes HARQ feedback information of at least one target transmission unit, and does not include HARQ feedback information of a non-target transmission unit. The target transmission unit indicates a downlink transmission unit that needs HARQ feedback in the plurality of downlink transmission units. The non-target transmission unit indicates a downlink transmission unit that does not need HARQ feedback in the plurality of downlink transmission units, or a downlink transmission unit whose HARQ feedback information is preset information in the plurality of downlink transmission units. The preset information is one or more of an acknowledgement ACK, a negative acknowledgement NACK, and a decoding result.

For example functions of elements of the access network device 80, refer to related descriptions of the access network device in FIG. 17 to FIG. 23. For brevity of the specification, details are not described herein again.

Figure 26:
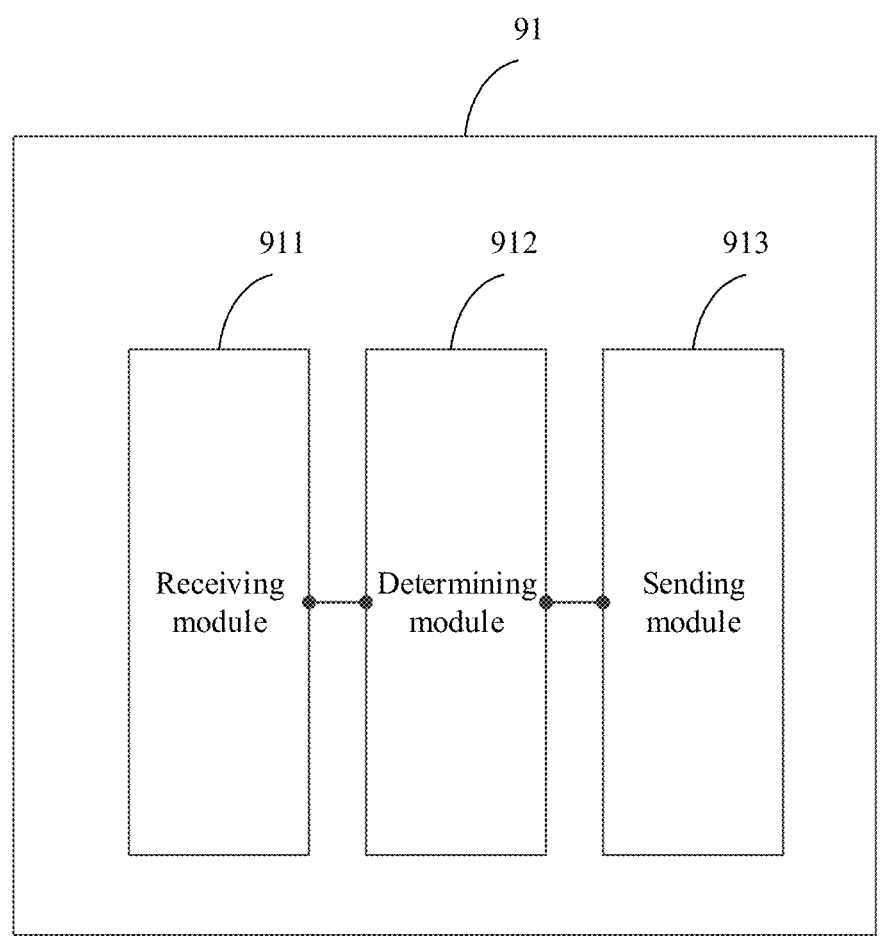
FIG. 26 is a schematic diagram of a structure of an apparatus according to an embodiment of the present disclosure.

FIG. 26 is a schematic diagram of an apparatus 91 according to an embodiment of the present disclosure. The apparatus 91 includes at least:

a receiving module 911, configured to receive indication information from an access network device, where the indication information is used to determine whether HARQ feedback is needed for a transmit block transmitted in a plurality of downlink transmission units;

a determining module 912, configured to determine HARQ bitmap information based on the indication information, where the HARQ bitmap information includes HARQ feedback information of at least one target transmission unit, and does not include HARQ feedback information of a non-target transmission unit, the target transmission unit indicates a downlink transmission unit that needs HARQ feedback in the plurality of downlink transmission units, the non-target transmission unit indicates a downlink transmission unit that does not need HARQ feedback in the plurality of downlink transmission units, or a downlink transmission unit whose HARQ feedback information is preset information in the plurality of downlink transmission units, and the preset information is one or more of an acknowledgement ACK, a negative acknowledgement NACK, and a decoding result; and a sending module 913, configured to send the HARQ bitmap information to the access network device.

The apparatus 91 may be used in a terminal. Functional modules of the apparatus 91 may be configured to implement related functions of the terminal in the foregoing FIG. 17 to FIG. 23. For brevity of the specification, details are not described herein again.

Figure 27:
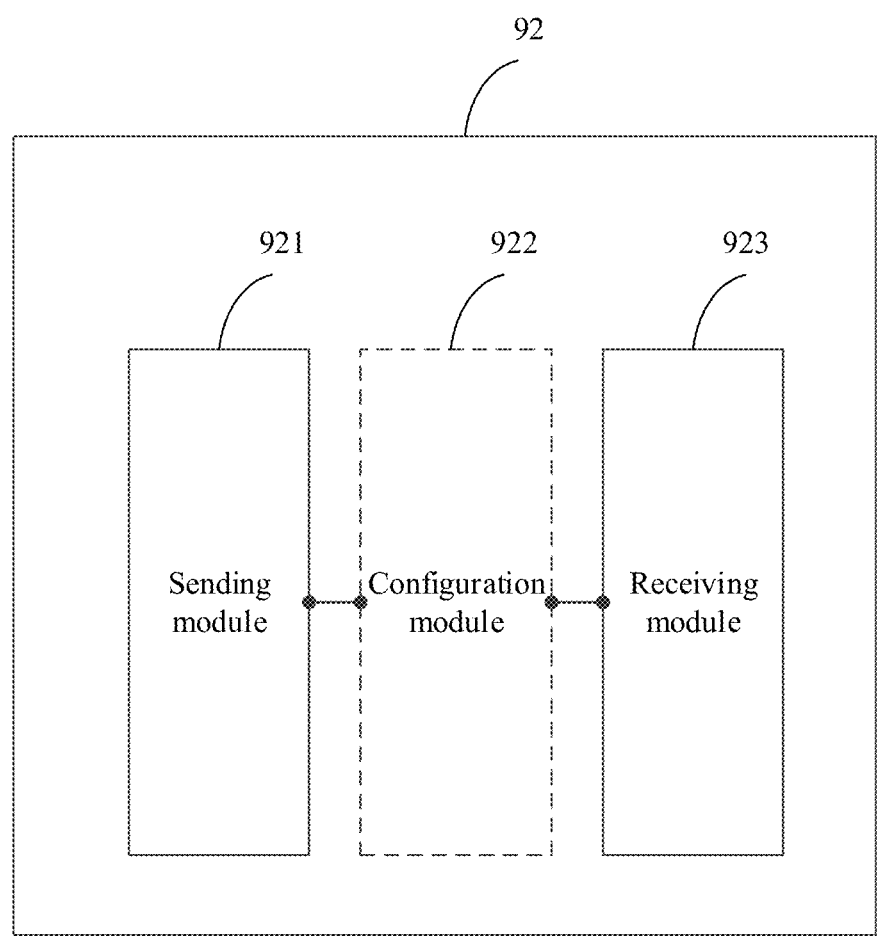
FIG. 27 is a schematic diagram of a structure of another apparatus according to an embodiment of the present disclosure.

FIG. 27 is a schematic diagram of another apparatus 92 according to an embodiment of the present disclosure. The apparatus 92 includes at least:

a configuration module 922, configured to configure a slot that needs/does not need HARQ feedback, determine an enabled HARQ process or a disabled HARQ process, and the like;

a sending module 921, configured to send indication information to a terminal, where the indication information is used to determine whether HARQ feedback is needed for a transmit block transmitted in a plurality of downlink transmission units; and a receiving module 923, configured to receive HARQ bitmap information from the terminal, where the HARQ bitmap information includes HARQ feedback information of at least one target transmission unit, and does not include HARQ feedback information of a non-target transmission unit, the target transmission unit indicates a downlink transmission unit that needs HARQ feedback in the plurality of downlink transmission units, the non-target transmission unit indicates a downlink transmission unit that does not need HARQ feedback in the plurality of downlink transmission units, or a downlink transmission unit whose HARQ feedback information is preset information in the plurality of downlink transmission units, and the preset information is one or more of an acknowledgement ACK, a negative acknowledgement NACK, and a decoding result.

The apparatus 92 may be used in an access network device, for example, a satellite base station. Functional modules of the apparatus 92 may be configured to implement related functions of the access network device in the foregoing FIG. 17 to FIG. 23. For brevity of the specification, details are not described herein again.

Accordingly, an embodiment of the present disclosure further provides a chip. The chip may be used in, for example, an access network device. The chip includes an input interface, an output interface, and a logic circuit. The output interface is configured to send data to a terminal, the input interface is configured to receive data from the terminal, and the logic circuit is configured to control the chip to perform functions. For examples of the performed functions, refer to related descriptions of the access network device in FIG. 17 to FIG. 23. For brevity of the specification, details are not described herein again.

An embodiment of the present disclosure further provides a system. The system includes a terminal and an access network device. The terminal may be the terminal described in the embodiment in FIG. 20, and the access network device may be the access network device described in the embodiment in FIG. 25. Alternatively, the terminal may be the apparatus described in the embodiment in FIG. 26, and the access network device may be the apparatus described in the embodiment in FIG. 27.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The storage medium may include: a magnetic disk, an optical disc, a read-only memory (ROM), or a random access memory (RAM).

What is disclosed above is merely an example embodiment of the present disclosure, and certainly is not intended to limit the scope of the claims of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. A hybrid automatic repeat request (HARQ) bitmap information feedback method, applied to an apparatus, the method comprising:

receiving indication information from an access network device, wherein the indication information indicates disabled HARQ processes and enabled HARQ processes in a plurality of HARQ processes;

determining HARQ bitmap information based on the indication information, wherein the HARQ bitmap information comprises HARQ feedback information corresponding to at least one target transmission unit and the HARQ bitmap information does not include HARQ feedback information corresponding to at least one non-target transmission unit, the at least one target transmission unit represents a downlink transmission unit of a transmit block corresponding to an enabled HARQ process, and the at least one non-target transmission unit represents a downlink transmission unit of a transmit block corresponding to a disabled HARQ process, and wherein the at least one target transmission unit comprises a plurality of target transmission units, and the plurality of target transmission units are consecutive downlink transmission units;

the at least one non-target transmission unit comprises a plurality of non-target transmission units, and the plurality of non-target transmission units are consecutive downlink transmission units; or the at least one target transmission unit and the at least one non-target transmission unit are alternately spaced in time domain; and sending the HARQ bitmap information to the access network device, wherein a type of the HARQ bitmap information is a semi-static type.

2. The method according to claim 1, wherein the determining the HARQ bitmap information based on the indication information comprises:

determining the at least one target transmission unit based on the indication information, wherein the enabled HARQ processes correspond to the at least one target transmission unit; and forming the HARQ bitmap information based on the HARQ feedback information corresponding to the at least one target transmission unit.

3. The method according to claim 1, wherein the indication information is comprised in radio resource control (RRC) signaling.

4. A hybrid automatic repeat request (HARQ) bitmap information feedback method, applied to an access network device, the method comprising:

sending indication information to a terminal, wherein the indication information indicates disabled HARQ processes and enabled HARQ processes in a plurality of HARQ processes; and receiving HARQ bitmap information from the terminal, wherein the HARQ bitmap information comprises HARQ feedback information corresponding to at least one target transmission unit and the HARQ bitmap information does not include HARQ feedback information corresponding to at least one non-target transmission unit, the at least one target transmission unit represents a downlink transmission unit of a transmit block corresponding to an enabled HARQ process, and the at least one non-target transmission unit represents a downlink transmission unit of a transmit block corresponding to a disabled HARQ process, wherein a type of the HARQ bitmap information is a semi-static type, and wherein the at least one target transmission unit comprises a plurality of target transmission units, and the plurality of target transmission units are consecutive downlink transmission units;

the at least one non-target transmission unit comprises a plurality of non-target transmission units, and the plurality of non-target transmission units are consecutive downlink transmission units; or the at least one target transmission unit and the at least one non-target transmission unit are alternately spaced in time domain.

5. The method according to claim 4, wherein the at least one target transmission unit is determined based on the indication information, wherein the enabled HARQ processes correspond to the at least one target transmission unit, and wherein the HARQ bitmap information is formed based on the HARQ feedback information corresponding to the at least one target transmission unit.

6. The method according to claim 4, wherein the indication information is comprised in radio resource control (RRC) signaling.

7. An apparatus, comprising:
a processor; and
a memory coupled to the processor to store instructions, which when executed by the processor, cause the apparatus to perform:
receiving indication information from a network device, wherein the indication information indicates disabled HARQ processes and enabled HARQ processes in a plurality of HARQ processes;
determining HARQ bitmap information based on the indication information, wherein the HARQ bitmap information comprises HARQ feedback information corresponding to at least one target transmission unit and the HARQ bitmap information does not include HARQ feedback information corresponding to at least one non-target transmission unit, the at least one target transmission unit represents a downlink transmission unit of a transmit block corresponding to an enabled HARQ process, and the at least one non-target transmission unit represents a downlink transmission unit of a transmit block corresponding to a disabled HARQ process,
and wherein the at least one target transmission unit comprises a plurality of target transmission units, and the plurality of target transmission units are consecutive downlink transmission units;
the at least one non-target transmission unit comprises a plurality of non-target transmission units, and the plurality of non-target transmission units are consecutive downlink transmission units; or
the at least one target transmission unit and the at least one non-target transmission unit are alternately spaced in time domain; and
sending the HARQ bitmap information, wherein a type of the HARQ bitmap information is a semi-static type.

8. The apparatus according to claim 7, wherein the determining the HARQ bitmap information based on the indication information comprises:
determining the at least one target transmission unit based on the indication information, wherein the enabled HARQ processes correspond to the at least one target transmission unit; and
forming the HARQ bitmap information based on the HARQ feedback information corresponding to the at least one target transmission unit.

9. The apparatus according to claim 7, wherein the indication information is comprised in radio resource control (RRC) signaling.

10. The method according to claim 1, wherein the indication information comprises indication parameter corresponding to each disabled HARQ process or each enabled HARQ process, wherein a parameter 0 represents an enabled HARQ process and a parameter 1 represents a disabled HARQ process.

11. The method according to claim 1, wherein the HARQ bitmap information further comprise a default NACK for the disabled HARQ process.

12. The method according to claim 4, wherein the indication information comprises indication parameter corresponding to each disabled HARQ process or each enabled HARQ process, wherein a parameter 0 represents an enabled HARQ process and a parameter 1 represents a disabled HARQ process.

13. The method according to claim 4, wherein the HARQ bitmap information further comprise a default NACK for the disabled HARQ process.

14. The apparatus according to claim 7, wherein the indication information comprises indication parameter corresponding to each disabled HARQ process or each enabled HARQ process, wherein a parameter 0 represents an enabled HARQ process and a parameter 1 represents a disabled HARQ process.

15. The apparatus according to claim 7, wherein the HARQ bitmap information further comprise a default NACK for the disabled HARQ process.

16. An apparatus, comprising:
a processor; and
a memory coupled to the processor to store instructions, which when executed by the processor, cause the apparatus to perform:
sending indication information to a terminal, wherein the indication information indicates disabled HARQ processes and enabled HARQ processes in a plurality of HARQ processes; and
receiving HARQ bitmap information from the terminal, wherein the HARQ bitmap information comprises HARQ feedback information corresponding to at least one target transmission unit and the HARQ bitmap information does not include HARQ feedback information corresponding to at least one non-target transmission unit, the at least one target transmission unit represents a downlink transmission unit of a transmit block corresponding to an enabled HARQ process, and the at least one non-target transmission unit represents a downlink transmission unit of a transmit block corresponding to a disabled HARQ process, wherein a type of the HARQ bitmap information is a semi-static type, and wherein the at least one target transmission unit comprises a plurality of target transmission units, and the plurality of target transmission units are consecutive downlink transmission units;

the at least one non-target transmission unit comprises a plurality of non-target transmission units, and the plurality of non-target transmission units are consecutive downlink transmission units; or the at least one target transmission unit and the at least one non-target transmission unit are alternately spaced in time domain.

17. The apparatus according to claim 16, wherein the at least one target transmission unit is determined based on the indication information, wherein the enabled HARQ processes correspond to the at least one target transmission unit, and wherein the HARQ bitmap information is formed based on the HARQ feedback information corresponding to the at least one target transmission unit.

18. The apparatus according to claim 16, wherein the indication information is comprised in radio resource control (RRC) signaling.

19. The apparatus according to claim 16, wherein the indication information comprises indication parameter corresponding to each disabled HARQ process or each enabled HARQ process, wherein a parameter 0 represents an enabled HARQ process and a parameter 1 represents a disabled HARQ process.

20. The apparatus according to claim 16, wherein the HARQ bitmap information further comprise a default NACK for the disabled HARQ process.

* * * * *